United States Patent
Yuasa et al.

(10) Patent No.: US 10,153,663 B2
(45) Date of Patent: Dec. 11, 2018

(54) POWER TRANSMISSION APPARATUS AND POWER RECEPTION APPARATUS

(71) Applicant: TOYOTA JIDOSHA KABUSHIKI KAISHA, Toyota-shi, Aichi-ken (JP)

(72) Inventors: Hiroaki Yuasa, Miyoshi (JP); Nobuhiro Kibudera, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 239 days.

(21) Appl. No.: 15/221,151

(22) Filed: Jul. 27, 2016

(65) Prior Publication Data
US 2017/0040845 A1    Feb. 9, 2017

(30) Foreign Application Priority Data

Aug. 5, 2015  (JP) ................. 2015-155439

(51) Int. Cl.
| | |
|---|---|
| *H01F 27/42* | (2006.01) |
| *H01F 37/00* | (2006.01) |
| *H01F 38/00* | (2006.01) |
| *H02J 50/12* | (2016.01) |
| *B60L 11/18* | (2006.01) |
| *H01F 27/02* | (2006.01) |
| *H01F 27/28* | (2006.01) |
| *H01F 27/36* | (2006.01) |
| *H01F 38/14* | (2006.01) |
| *H02J 7/02* | (2016.01) |
| *H01F 3/10* | (2006.01) |

(52) U.S. Cl.
CPC ............. *H02J 50/12* (2016.02); *B60L 11/182* (2013.01); *H01F 27/02* (2013.01); *H01F 27/2871* (2013.01); *H01F 27/362* (2013.01); *H01F 27/365* (2013.01); *H01F 38/14* (2013.01); *H02J 7/025* (2013.01); *H01F 2003/106* (2013.01)

(58) Field of Classification Search
CPC . H02J 5/005; H02J 7/025; H02J 17/00; H01F 38/14; B60L 11/182
USPC .......................................................... 307/104
See application file for complete search history.

(56) References Cited

U.S. PATENT DOCUMENTS

| | | |
|---|---|---|
| 7,741,734 B2 | 6/2010 | Joannopoulos et al. |
| 2007/0222542 A1 | 9/2007 | Joannopoulos et al. |
| 2008/0129246 A1 | 6/2008 | Morita et al. |
| 2008/0278264 A1 | 11/2008 | Karalis et al. |
| 2009/0195332 A1 | 8/2009 | Joannopoulos et al. |
| 2009/0195333 A1 | 8/2009 | Joannopoulos et al. |

(Continued)

FOREIGN PATENT DOCUMENTS

| | | |
|---|---|---|
| AU | 2006269374 B2 | 1/2007 |
| AU | 2007349874 A2 | 10/2008 |

(Continued)

*Primary Examiner* — Quan Tra
(74) *Attorney, Agent, or Firm* — Oliff PLC

(57) ABSTRACT

A power transmission apparatus includes: a power transmission coil which is formed to surround a winding axis extending in the top-bottom direction, and which has a hollow formed in a center thereof; a ferrite core which has an upper surface on which the power transmission coil is disposed, and which has an opening formed therein, the opening located in the hollow in the power transmission coil when viewed from above; and a metal member located in the hollow and the opening when viewed from above the power transmission coil and the ferrite core.

8 Claims, 25 Drawing Sheets

(56) References Cited

U.S. PATENT DOCUMENTS

| | | |
|---|---|---|
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |
| 2010/0007215 A1* | 1/2010 | Sakuma ............... H01F 38/14 307/104 |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2012/0218068 A1* | 8/2012 | Yamakawa ........... H01Q 1/3225 336/90 |
| 2012/0319647 A1 | 12/2012 | Itabashi et al. |
| 2013/0113423 A1 | 5/2013 | Baarman et al. |
| 2013/0127409 A1 | 5/2013 | Ichikawa |
| 2013/0169062 A1 | 7/2013 | Maikawa et al. |
| 2013/0181667 A1 | 7/2013 | Takeshita et al. |
| 2013/0193749 A1 | 8/2013 | Nakamura et al. |
| 2014/0239728 A1 | 8/2014 | Yamakawa et al. |
| 2014/0246919 A1 | 9/2014 | Hatanaka et al. |
| 2014/0306653 A1 | 10/2014 | Hirobe et al. |
| 2015/0008877 A1 | 1/2015 | Ichikawa et al. |
| 2015/0115723 A1 | 4/2015 | Levo et al. |
| 2015/0136499 A1 | 5/2015 | Ichikawa |
| 2016/0233723 A1* | 8/2016 | Lestoquoy ............... H02J 50/12 |
| 2017/0259677 A1* | 9/2017 | Stewing ............. B60L 11/1825 |

FOREIGN PATENT DOCUMENTS

| | | |
|---|---|---|
| AU | 2010200044 A1 | 1/2010 |
| AU | 2006269374 C1 | 3/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| CN | 102356530 A | 2/2012 |
| EP | 1 902 505 A2 | 3/2008 |
| EP | 2 130 287 A1 | 12/2009 |
| EP | 2816663 A1 | 12/2014 |
| IN | 735/DELNP/2008 | 5/2008 |
| IN | 6195/DELNP/2009 | 7/2010 |
| JP | 2008-120239 A | 5/2008 |
| JP | 2009-501510 A | 1/2009 |
| JP | 2012-178529 A | 9/2012 |
| JP | 2012-217228 A | 11/2012 |
| JP | 2013-110822 A | 6/2013 |
| JP | 2013-126327 A | 6/2013 |
| JP | 2013-146148 A | 7/2013 |
| JP | 2013-146154 A | 7/2013 |
| JP | 2013-154815 A | 8/2013 |
| JP | 2014-179543 A | 9/2014 |
| JP | 2014-204104 A | 10/2014 |
| JP | 2015-002440 A | 1/2015 |
| KR | 2008-0031398 A | 4/2008 |
| KR | 2010-0015954 A | 2/2010 |
| WO | 2007/008646 A2 | 1/2007 |
| WO | 2008/118178 A1 | 10/2008 |
| WO | 2010/080739 A2 | 7/2010 |
| WO | 2011/096569 A1 | 8/2011 |

* cited by examiner

POWER TRANSMISSION APPARATUS AND POWER RECEPTION APPARATUS

This nonprovisional application is based on Japanese Patent Application No. 2015-155439 filed on Aug. 5, 2015, with the Japan Patent Office, the entire contents of which are hereby incorporated by reference.

BACKGROUND

Technical Field

The present disclosure relates to a power transmission apparatus and a power reception apparatus.

Description of the Background Art

A variety of wireless charging systems in which electric power is wirelessly transmitted from a power transmission apparatus to a power reception apparatus have been conventionally proposed (Japanese Patent Laying-Open No. 2013-154815, Japanese Patent Laying-Open No. 2013-146154, Japanese Patent Laying-Open No. 2013-146148, Japanese Patent Laying-Open No. 2013-110822, and Japanese Patent Laying-Open No. 2013-126327).

Japanese Patent Laying-Open No. 2008-120239 describes a power transmission apparatus and a power reception apparatus. The power transmission apparatus includes an E-shaped core formed by stacking a plurality of block cores, and a power transmission coil mounted on the E-shaped core. A spiral coil is adopted as the power transmission coil.

The power reception apparatus includes an E-shaped core formed by stacking a plurality of block cores, and a power reception coil mounted on the E-shaped core. A spiral coil is adopted as the power reception coil.

In each of the power transmission apparatus and the power reception apparatus, the E-shaped core includes a central protruding portion and protruding portions at each end of the core. Each coil is wound around each central protruding portion.

SUMMARY

In each of the power transmission apparatus and the power reception apparatus described in Japanese Patent Laying-Open No. 2008-120239, the coil is mounted around the central protruding portion formed to have a protruding shape. The present inventors found that, when power transfer is performed between the power transmission apparatus and the power reception apparatus configured in this manner, there is a great difference between the coefficient of coupling when the power reception coil and the power transmission coil are spaced a prescribed distance from each other and the coefficient of coupling when the power reception coil and the power transmission coil are close to each other. The inventors thus conducted extensive research on the reason that the above-described phenomenon occurs.

The inventors found that, when the power reception coil and the power transmission coil are spaced a prescribed distance from each other, the amount of magnetic flux passing through a central region of the central protruding portion of the power transmission apparatus and a central region of the central protruding portion of the power reception apparatus is small.

Specifically, it was found that, when the power transmission coil and the power reception coil are spaced a prescribed distance from each other, the power transmission apparatus emits magnetic flux toward the power reception apparatus from a portion of the upper surface of the central protruding portion in the vicinity of the inner peripheral edge of the power transmission coil, and the magnetic flux enters the power reception apparatus through a portion of the lower surface of the central protruding portion in the vicinity of the inner peripheral edge of the power reception coil.

It was found that, when the power reception coil and the power transmission coil are close to each other, the power transmission apparatus emits magnetic flux from substantially the entire upper surface of the central protruding portion, and the magnetic flux enters the power reception apparatus through substantially the entire lower surface of the central protruding portion.

It was found, as a result, that as the distance between the power transmission coil and the power reception coil in the top-bottom direction varies, the amount of the magnetic flux passing through the central protruding portion of the power transmission apparatus and the central protruding portion of the power reception apparatus varies significantly, resulting in large variation of the coupling coefficient between the power reception coil and the power transmission coil. The large variation of the coupling coefficient causes large variation of the voltage received by the power reception coil and the current transmitted by the power transmission coil, resulting in the need to ensure a wide range of the withstand voltage of the power reception apparatus or a wide range of the withstand current of the power transmission apparatus.

The present embodiments have been made in view of the above-described problems, and an object of the embodiments is to provide a power transmission apparatus and a power reception apparatus capable of suppressing large variation of the coupling coefficient even when the distance between a power transmission coil and a power reception coil in the top-bottom direction varies.

A power transmission apparatus according to one aspect of the present disclosure includes: a power transmission coil which includes a first main surface and a second main surface located opposite the first main surface in an electric power transmission direction, and which has a hollow formed in a center of the power transmission coil; a ferrite core disposed at the second main surface of the power transmission coil and having an opening formed therein, the opening located in the hollow when the power transmission coil is viewed in a direction in which a winding axis of the power transmission coil extends; and a metal member which is disposed in a space formed by the hollow and the opening, and which is located in the opening when the power transmission coil is viewed in the direction in which the winding axis of the power transmission coil extends.

When the power transmission coil and the power reception coil are spaced a prescribed distance from each other, magnetic flux from the power transmission coil flows to pass in the vicinity of the power transmission coil toward the power reception coil, penetrates the power reception coil, then returns to the vicinity of the power transmission coil.

When the power transmission coil and the power reception coil are closer to each other, the length of the magnetic path between the power transmission coil and the power reception coil decreases, so that a large amount of magnetic flux flows. Thus, the magnetic flux returning from the power reception coil returns to the power transmission coil by passing not only in the vicinity of the power transmission coil, but also through the hollow in the power transmission coil and the opening in the ferrite.

Meanwhile, since the metal member is provided in the opening, the magnetic flux passing through the hollow and the opening is reflected by the metal member.

Thus, the magnetic flux returning to the power transmission coil from the power reception coil returns to the power transmission coil by passing through a magnetic path where the metal member is not provided.

In this manner, the path through which the magnetic flux passes is limited. Consequently, an excessive increase in the amount of the magnetic flux passing through the power transmission coil and the power reception coil is suppressed.

As a result, the occurrence of a large difference between the coupling coefficient when the power transmission coil and the power reception coil are apart from each other and the coupling coefficient when the power transmission coil and the power reception coil are close to each other can be suppressed, thereby suppressing large variation of the coupling coefficient due to the distance between the power reception coil and the power transmission coil.

Preferably, the power transmission apparatus further includes: a device connected to the power transmission coil; and a housing ease made of metal in which the device is housed. At least a portion of the metal member is the housing case.

By making the case for housing the device of metal, the emission of noise emitted from the device to the outside can be suppressed. Furthermore, since the housing case doubles as the above-described metal member, there is no need to provide a metal member other than the housing case, thus allowing a reduction in the number of components.

Preferably, the housing case includes a protruding portion protruding toward the hollow from the opening. The protruding portion includes a peripheral surface, and a ceiling portion formed at a tip portion of the peripheral surface. The peripheral surface of the protruding portion is a curved surface that projects toward a central region of the protruding portion, and a width of the protruding portion in a direction perpendicular to the winding axis of the power transmission coil decreases as the protruding portion extends toward the electric power transmission direction.

The magnetic flux emitted from the inner surface of the hollow in the power transmission coil travels toward the electric power transmission direction as it approaches the protruding portion. Meanwhile, since the peripheral surface of the protruding portion is formed such that it is curved toward the central region of the protruding portion, the entry of the magnetic flux of the power transmission coil into the peripheral surface of the protruding portion can be suppressed. This can prevent the protruding portion from reaching a high temperature, and can prevent lowering of the power transmission efficiency.

A power transmission apparatus according to another aspect of the present disclosure includes: a power transmission coil which includes a first main surface and a second main surface located opposite the first main surface in an electric power transmission direction, and which has a hollow formed in a center of the power transmission coil; a ferrite core disposed at the second main surface of the power transmission coil and having an opening formed therein, the opening located in the hollow when the power transmission coil is viewed in a direction in which a winding axis of the power transmission coil extends; and a high-resistance member which is disposed in a space formed by the hollow and the opening, which is located in the opening when the power transmission coil is viewed in the direction in which the winding axis of the power transmission coil extends, and which has a higher magnetic resistance than a magnetic resistance of the ferrite core.

When the power transmission coil and the power reception coil are spaced a prescribed distance from each other, magnetic flux from the power transmission coil flows to pass in the vicinity of the power transmission coil toward the power reception coil, penetrates the power reception coil, then returns to the vicinity of the power transmission coil.

When the power transmission coil and the power reception coil are closer to each other, the length of the magnetic path between the power transmission coil and the power reception coil decreases, so that a large amount of magnetic flux flows. Thus, the magnetic flux returning from the power reception coil returns to the power transmission coil by passing not only in the vicinity of the power transmission coil, but also through the hollow in the power transmission coil and the opening in the ferrite.

Meanwhile, since the high-resistance member is provided in the opening, the magnetic resistance of the magnetic path passing through the hollow in the power transmission coil and the opening in the ferrite core increases. As a result, an excessive increase in the amount of the magnetic flux passing through the hollow in the power transmission coil and the opening in the ferrite core is suppressed.

As a result, the occurrence of a large difference between the coupling coefficient when the power transmission coil and the power reception coil are apart from each other and the coupling coefficient when the power transmission coil and the power reception coil are close to each other can be suppressed, thereby suppressing large variation of the coupling coefficient due to the distance between the power reception coil and the power transmission coil.

A power reception apparatus according to another aspect of the present disclosure includes: a power reception coil which includes a first main surface and a second main surface located opposite the first main surface in an electric power reception direction, and which has a hollow formed in a center of the power reception coil; a ferrite core disposed at the second main surface of the power reception coil and having an opening formed therein, the opening located in the hollow when the power reception coil is viewed in a direction in which a winding axis of the power reception coil extends; and a metal member which is disposed in a space formed by the hollow and the opening, and which is located in the opening when the power reception coil is viewed in the direction in which the winding axis of the power reception coil extends.

When the power reception coil and the power transmission coil are apart from each other, magnetic flux from the power transmission coil passes in the vicinity of the power reception coil and returns to the power transmission coil.

When the power transmission coil and the power reception coil are closer to each other, the length of the magnetic path between the power transmission coil and the power reception coil decreases, so that a large amount of flux penetrates the power reception coil. Thus, the magnetic flux from the power transmission coil toward the power reception coil passes not only in the vicinity of the power reception coil, but also through the hollow in the power transmission coil and the opening in the ferrite core.

Meanwhile, since the metal member is provided in the opening, the magnetic flux passing through the hollow and the opening is reflected by the metal member.

Then, the magnetic flux from the power transmission coil passes through a magnetic path where the metal member is not provided.

As a result, the occurrence of a large difference between the amount of the magnetic flux penetrating the power reception coil when the power reception coil and the power transmission coil are spaced a prescribed distance from each other and the amount of the magnetic flux penetrating the power reception coil when the power reception coil and the power transmission coil are close to each other is suppressed.

Therefore, even when the distance between the power reception coil and the power transmission coil varies, large variation of the coupling coefficient can be suppressed.

A power reception apparatus according to another aspect of the present disclosure includes: a power reception coil which includes a first main surface and a second main surface located opposite the first main surface in an electric power reception direction, and which has a hollow formed in a center of the power reception coil; a ferrite core disposed at the second main surface of the power reception coil and having an opening formed therein, the opening located in the hollow when the power reception coil is viewed in a direction in which a winding axis of the power reception coil extends; and a high-resistance member which is disposed in a space formed by the hollow and the opening, which is located in the opening when the power reception coil is viewed in the direction in which the winding axis of the power reception coil extends, and which has a higher magnetic resistance than a magnetic resistance of the ferrite core.

According to the power reception apparatus described above, even when the distance between the power reception coil and the power transmission coil varies, large variation of the magnetic flux penetrating the power reception coil can be suppressed, thereby suppressing large variation of the coupling coefficient.

The foregoing and other objects, features, aspects and advantages of the present disclosure will become more apparent from the following detailed description when taken in conjunction with the accompanying drawings.

DESCRIPTION OF PREFERRED EMBODIMENTS

First Embodiment

Figure 1:
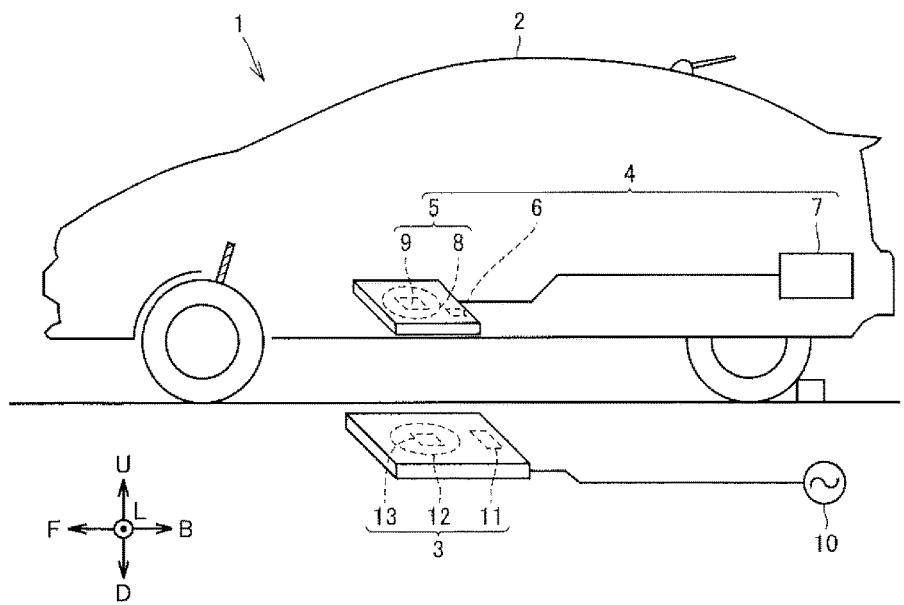
FIG. 1 a schematic diagram schematically showing a wireless charging system 1.
Figure 2:
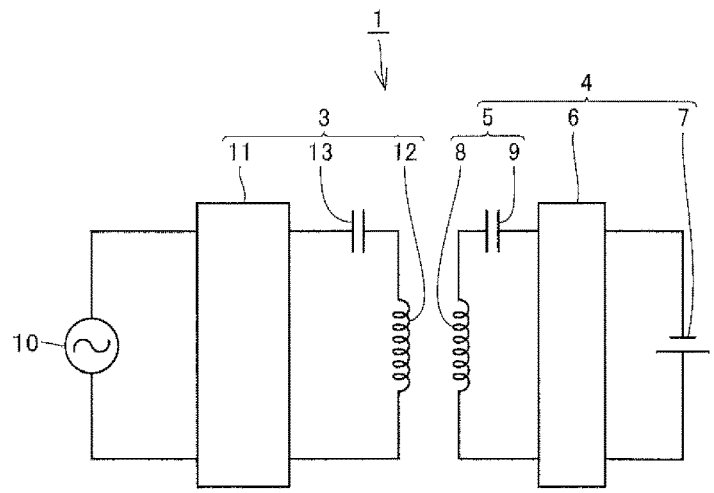
FIG. 2 is a circuit diagram schematically showing wireless charging system 1.

FIG. 1 is a schematic diagram schematically showing a wireless charging system 1, and FIG. 2 is a circuit diagram schematically showing wireless charging system 1. As shown in FIGS. 1 and 2, wireless charging system 1 includes a power reception unit 4 mounted on a vehicle 2, and a power transmission apparatus 3 for wirelessly transmitting electric power to power reception unit 4.

Power reception unit 4 includes a power reception apparatus 5 for receiving the electric power transmitted from power transmission apparatus 3, a rectifier 6 for converting the alternating-current (AC) power received by power reception apparatus 5 into direct-current (DC) power and adjusting the voltage, and a battery 7 for storing the DC power supplied from rectifier 6.

The electric power stored in battery 7 is supplied to a not-shown driving motor or the like, which drives the wheels of the vehicle 2.

Power reception apparatus 5 includes a power reception coil 8 and a capacitor 9 connected to rectifier 6. Power reception coil 8 and capacitor 9 form a series LC resonant circuit.

Power transmission apparatus 3 includes a frequency converter 11 connected to a power supply 10, and a power transmission coil 12 and a capacitor 13 connected to frequency converter 11.

Frequency converter 11 adjusts the frequency of AC power supplied from power supply 10 and supplies the power to power transmission coil 12 and capacitor 13, and adjusts the voltage supplied to power transmission coil 12 and capacitor 13. Power transmission coil 12 and capacitor 13 form a series LC resonant circuit.

The resonant circuit formed by power transmission coil 12 and capacitor 13 and the resonant circuit formed by power reception coil 8 and capacitor 9 are configured to have respective resonant frequencies which are equal or substantially equal to each other.

The resonant circuit formed by power transmission coil 12 and capacitor 13 and the resonant circuit formed by power reception coil 8 and capacitor 9 have respective Q factors which are both 100 or more.

Figure 3:
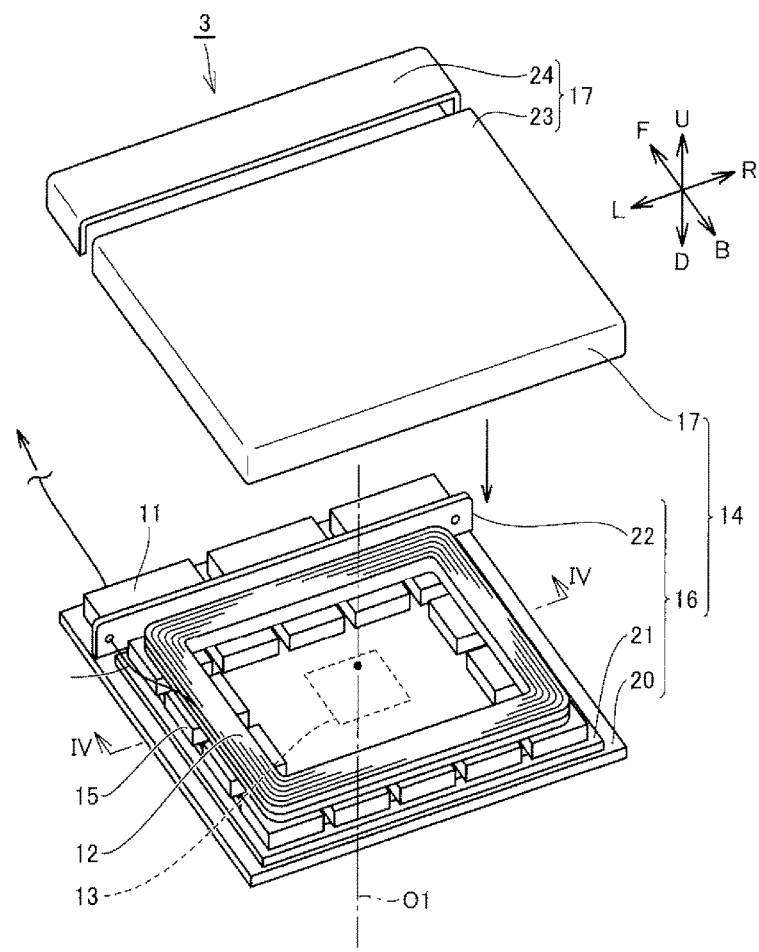
FIG. 3 is an exploded perspective view showing a power transmission apparatus 3.

FIG. 3 is an exploded perspective view showing power transmission apparatus 3. As shown in FIG. 3, power transmission apparatus 3 includes a housing 14, power transmission coil 12 housed in housing 14, a ferrite core 15 having an upper surface on which power transmission coil 12 is disposed, and frequency converter 11.

Housing 14 includes a housing case 16 having a space formed therein for housing devices such as capacitor 13, and a cover 17 disposed to cover housing case 16.

Housing case 16 includes a base plate 20, a housing portion 21 formed on the upper surface of base plate 20 and housing devices such as capacitor 13 therein, and a partition plate 22 formed on the upper surface of base plate 20.

Partition plate 22 separates the upper surface of base plate 20 into a region where housing portion 21, power transmission coil 12 and ferrite core 15 are disposed and a region where frequency converter 11 is disposed.

Cover 17 includes a resin cover 23 for covering power transmission coil 12, ferrite core 15 and housing portion 21, and a metal cover 24 provided to cover frequency converter 11.

While frequency converter 11 is not housed in housing portion 21 in the example shown in FIG. 3, frequency converter 11 may be housed in housing portion 21. In this case, partition plate 22 and metal cover 24 may be omitted.

Figure 4:
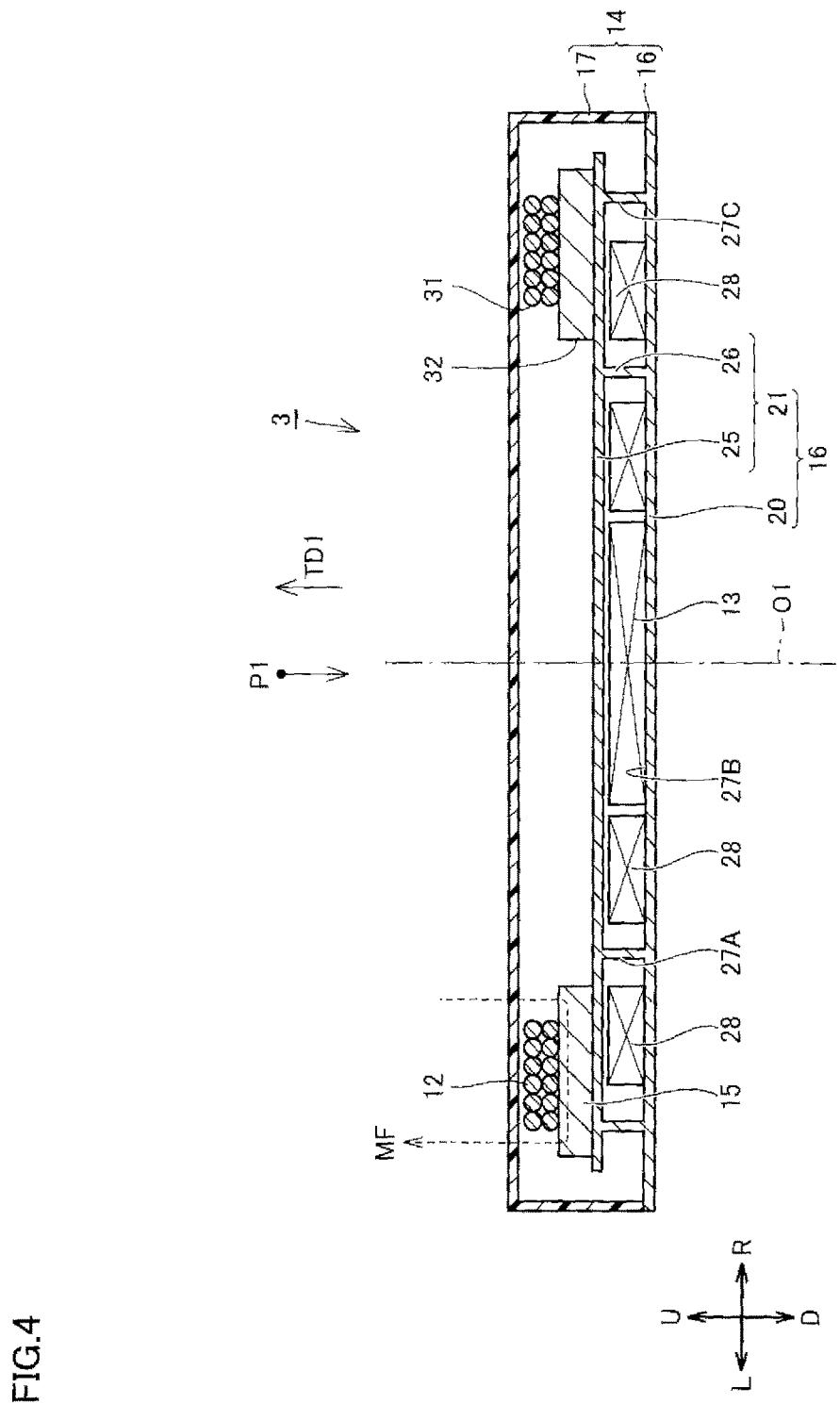
FIG. 4 is a cross-sectional view along a line IV-IV shown in FIG. 3.

FIG. 4 is a cross-sectional view along a line IV-IV shown in FIG. 3. As shown in FIG. 4, housing portion 21 includes a ceiling portion 25, and a compartment wall 26 connecting ceiling portion 25 to base plate 20 and forming a housing chamber for housing various devices.

In the cross section shown in FIG. 4, housing chambers 27A, 27B and 27C are formed, with capacitor 13 and a low-voltage device 28 housed in housing chamber 27B. In FIG. 4, an electric power transmission direction TD1 indicates a direction in which electric power is transmitted from power transmission coil 12. In the example shown in FIG. 4, electric power transmission direction TD1 is a vertically upward direction. Electric power transmission direction TD1 varies with the mounting orientation of power transmission coil 12, and is not limited to the vertically upward direction.

Figure 5:
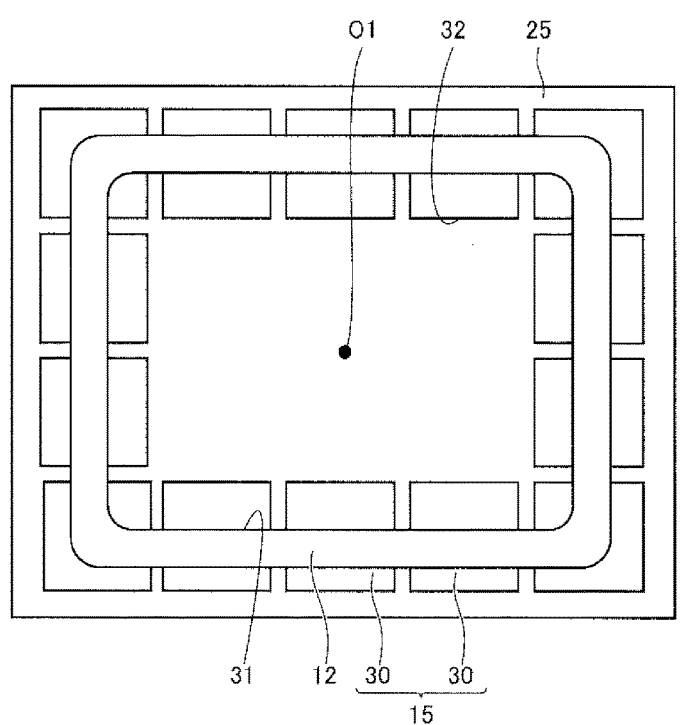
FIG. 5 is a plan view of a power transmission coil 12 and a ferrite core 15 as seen from a position P1 located above power transmission coil 12 and ferrite core 15.

FIG. 5 is a plan view of power transmission coil 12 and ferrite core 15 as seen from a position P1 located above power transmission coil 12 and ferrite core 15.

As shown in FIG. 5, ferrite core 15 includes a plurality of divided core members 30 arranged annularly and spaced apart from one another.

Since divided core members 30 are arranged annularly, ferrite core 15 has an opening 32 formed in a central region thereof.

Power transmission coil 12 is formed to surround a winding axis O1 as shown in FIGS. 4 and 5. Power transmission coil 12 is disposed such that winding axis O1 extends in a direction along electric power transmission direction TD1. Power transmission coil 12 includes an upper surface (first main surface) and a lower surface (second main surface) aligned in the direction in which winding axis O1 extends. The lower surface of power transmission coil 12 is located opposite the upper surface in electric power transmission direction TD1. Power transmission coil 12 is formed to have a hollow shape, and has a hollow (a space; a gap) 31 formed in the center thereof. Ferrite core 15 is disposed at the lower surface (second main surface) of power transmission coil 12.

When power transmission coil 12 and ferrite core 15 are seen in plan view from position P1 in the direction in which winding axis O1 extends, opening 32 is located in hollow 31. That is, opening 32 and hollow 31 are aligned with each other. Also, opening 32 has a radial dimension that is smaller than a radial dimension of hollow 31. The upper surface of ceiling portion 25 is exposed at opening 32. That is, when ceiling portion 25 is seen along winding axis O1 in a space formed by hollow 31 and opening 32, ceiling portion 25 is partially located in opening 32.

Figure 6:
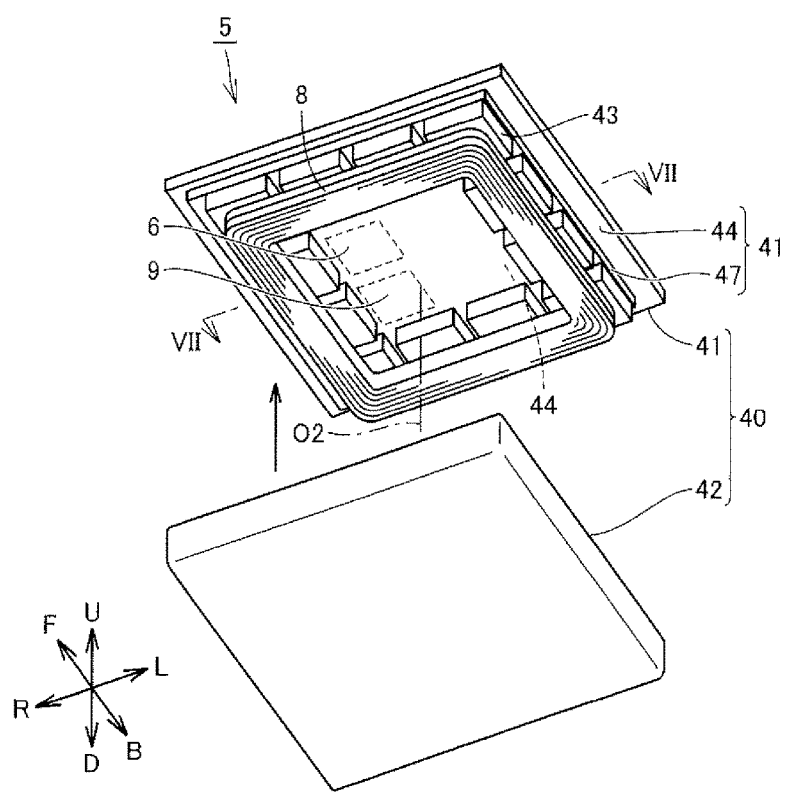
FIG. 6 is an exploded perspective view showing a power reception apparatus 5.

FIG. 6 is an exploded perspective view showing power reception apparatus 5. As shown in FIG. 6, power reception apparatus 5 includes a housing 40 including a housing case 41 and a resin cover 42, power reception coil 8 and a ferrite core 43 housed in housing 40, and rectifier 6 and capacitor 9 housed in housing case 41.

Figure 7:
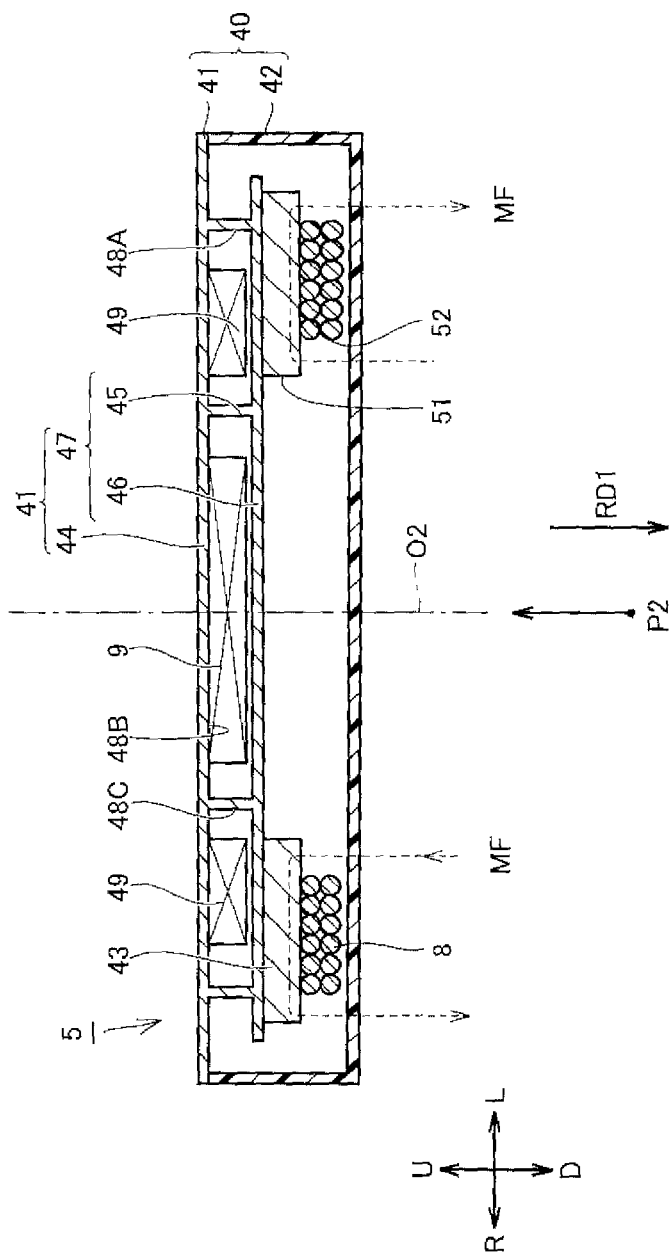
FIG. 7 is a cross-sectional view along a line VII-VII shown in FIG. 6.

FIG. 7 is a cross-sectional view along a line VII-VII shown in FIG. 6. As shown in FIG. 7, housing case 41 includes a base plate 44 and a housing portion 47 formed on the lower surface of the base plate 44. Housing portion 47 includes a flat portion 46 and a compartment wall 45 connecting flat portion 46 to base plate 44 and forming a housing chamber for housing a plurality of devices.

In the example shown in FIG. 7, housing chambers 48A, 48B and 48C are formed in housing case 41, with capacitor 9 housed in housing chamber 48B.

A plurality of devices 49 are housed in housing chambers 48A, 48B and 48C. The plurality of devices 49 form rectifier 6.

Capacitor 9 and devices 49 are disposed at the upper surface of flat portion 46, while ferrite core 43 is disposed at the lower surface of flat portion 46. In FIG. 7, an electric power reception direction RD1 indicates a direction in which power reception coil 8 receives electric power from power transmission coil 12. While electric power reception direction RD1 is a vertically downward direction in the example shown in FIG. 7, electric power reception direction RD1 varies with the mounting orientation of power transmission coil 12 and the like. Power reception coil 8 includes a lower surface (first main surface) and an upper surface (second main surface) located opposite the lower surface in electric power reception direction RD1. Ferrite core 43 is disposed at the upper surface (second main surface) of power reception coil 8.

Figure 8:
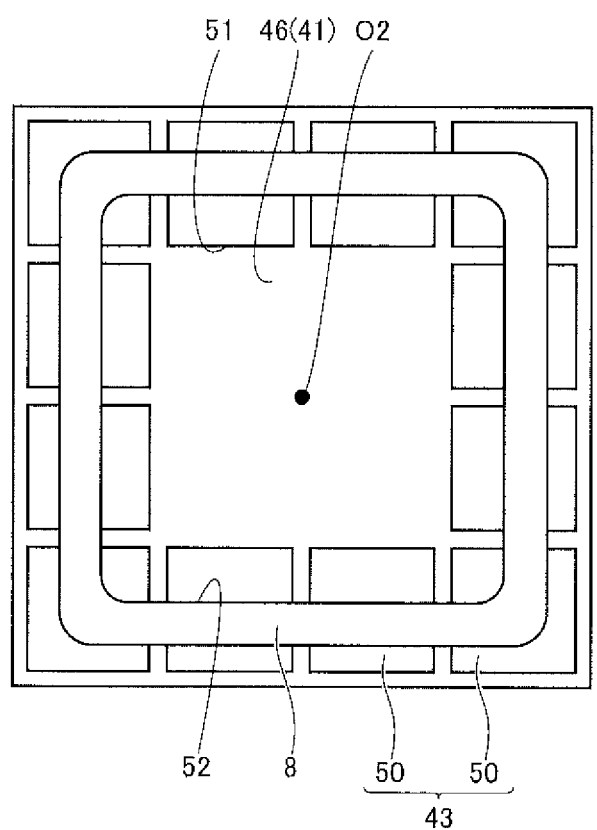
FIG. 8 is a plan view of a housing case 41, a ferrite core 43 and a power reception coil 8 as seen from a position P2 located below housing case 41, ferrite core 43 and power reception coil 8.

FIG. 8 is a plan view of housing case 41, ferrite core 43 and power reception coil 8 as seen from a position P2 located below housing case 41, ferrite core 43 and power reception coil 8.

As shown in FIG. 8, ferrite core 43 includes a plurality of divided core members 50 arranged annularly and spaced apart from one another. Thus, ferrite core 43 has an opening 51 formed in a central region thereof.

Power reception coil 8 is formed by winding a coil wire to surround a winding axis O2 extending in the top-bottom direction. Power reception coil 8 is formed to have a hollow shape, and has a hollow (a space; a gap) 52 formed in a central region thereof. Power reception coil 8 is disposed such that winding axis O2 extends along electric power reception direction RD1.

Here, when power reception coil 8 and ferrite core 43 are seen from position P2 in the direction in which winding axis O2 extends, opening 51 is located in hollow 52. That is, opening 51 and hollow 52 are aligned with each other. Also, opening 51 has a radial dimension that is smaller than a radial dimension of hollow 52. Thus, flat portion 46 of housing case 41 is exposed at opening 51. That is, in FIG. 7, when housing case 41 is seen along winding axis O2 in a space formed by hollow 52 and opening 51, flat portion 46 is partially located in opening 51.

The description will be given of a case where electric power is transmitted from power transmission apparatus 3 to power reception apparatus 5 by means of power reception apparatus 5 and power transmission apparatus 3 configured as described above.

Figure 9:
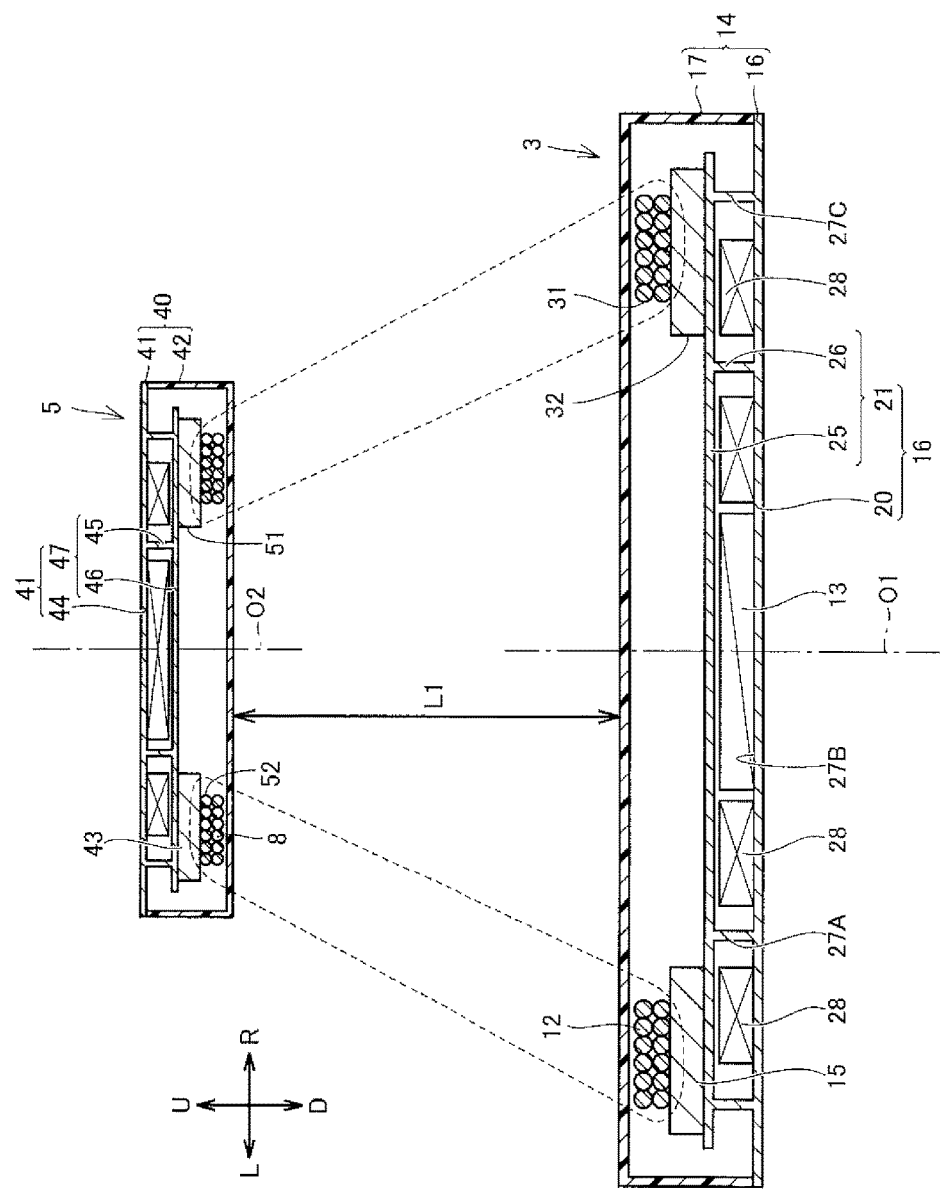
FIG. 9 is a cross-sectional view of a state where power transmission apparatus 3 and power reception apparatus 5 are positionally aligned with each other and spaced a prescribed distance from each other.

FIG. 9 is a cross-sectional view of a state where power transmission apparatus 3 and power reception apparatus 5 are positionally aligned with each other and spaced a prescribed distance from each other.

The state where power transmission apparatus 3 and power reception apparatus 5 are positionally aligned with each other means a state where, for example, winding axis O2 of power reception coil 8 coincides with winding axis O1 of power transmission coil 12. In FIG. 9, the distance in the vertical direction between power reception coil 8 and power transmission coil 12 is a distance L1.

When a current is supplied to power transmission coil 12 of power transmission apparatus 3, magnetic flux MF is generated around power transmission coil 12.

Magnetic flux MF successively passes through, for example, a portion of ferrite core 15 located closer to the outer periphery than power transmission coil 12, the gap, and a portion of ferrite core 43 located closer to the outer periphery than power reception coil 8. Furthermore, magnetic flux MF successively passes through ferrite core 43, a portion of ferrite core 43 located closer to the inner periphery than power reception coil 8, the gap, a portion of ferrite core 15 located closer to the inner periphery than power transmission coil 12, and ferrite core 15.

Since the electric power supplied to power transmission coil 12 is AC power, the direction in which magnetic flux MF flows periodically alternates between the above-described path and a path opposite the above-described path.

Figure 10:
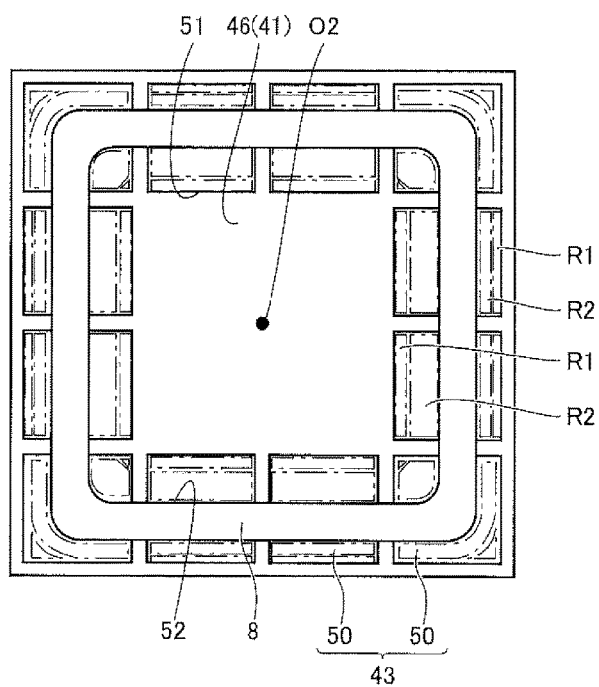
FIG. 10 is a plan view showing the distribution of magnetic strength of magnetic flux MF flowing through ferrite core 43 in the state shown in FIG. 9.

FIG. 10 is a plan view showing the distribution of magnetic strength of magnetic flux MF flowing through ferrite core 43 in the state shown in FIG. 9. In FIG. 10, a region R2 indicates a region of higher magnetic strength than region R1.

In the example shown in FIG. 10, in each divided core member 50, region R1 and region R2 are located in a portion located on an inner side of power reception coil 8. Region R2 is distributed along hollow 52 in power reception coil 8, and region R1 is distributed closer to winding axis O2 than region R2.

In each divided core member 50, region R1 and region R2 are also distributed in a portion located on an outer side of power reception coil 8. Region R2 is distributed along the outer peripheral edge of power reception coil 8, and region R1 is distributed on an outer side of region R2.

Figure 11:
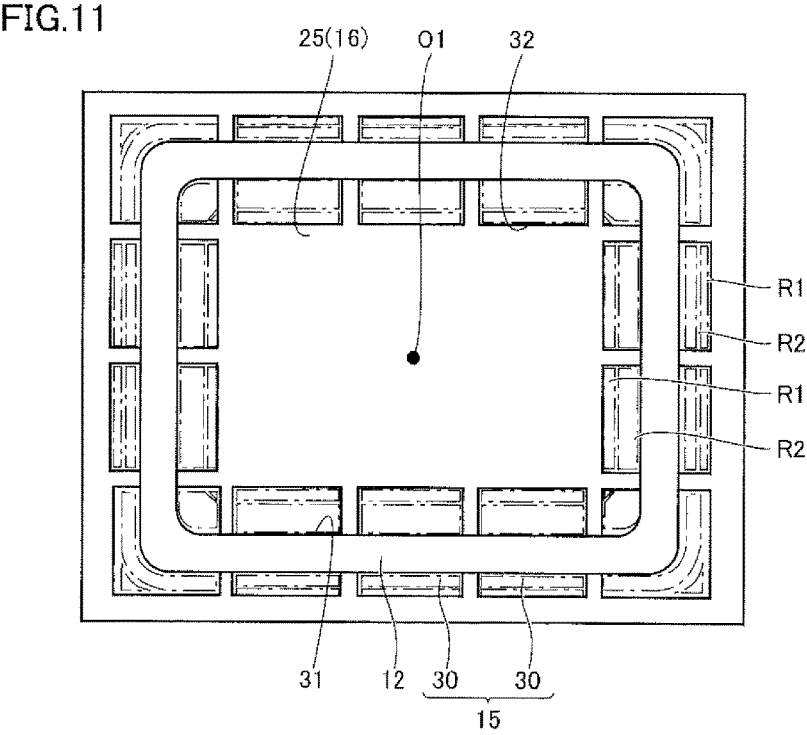
FIG. 11 is a plan view showing the distribution of magnetic strength of magnetic flux MF flowing through ferrite core 15 in the state shown in FIG. 9.

FIG. 11 is a plan view showing the distribution of magnetic strength of magnetic flux MF flowing through ferrite core 15 in the state shown in FIG. 9. As shown in FIG. 11, in each divided core member 30, region R1 and region R2 are distributed in a portion located closer to the inner periphery than power transmission coil 12. Region R2 is distributed along hollow 31 in power transmission coil 12. Region R1 is distributed closer to winding axis O1 than region R2. In each divided core member 30, region R1 and region R2 are also distributed in a portion located on an outer side of power transmission coil 12. Region R2 is distributed along the outer peripheral edge of power transmission coil 12, and region R1 is distributed on an outer side of region R2.

Figure 12:
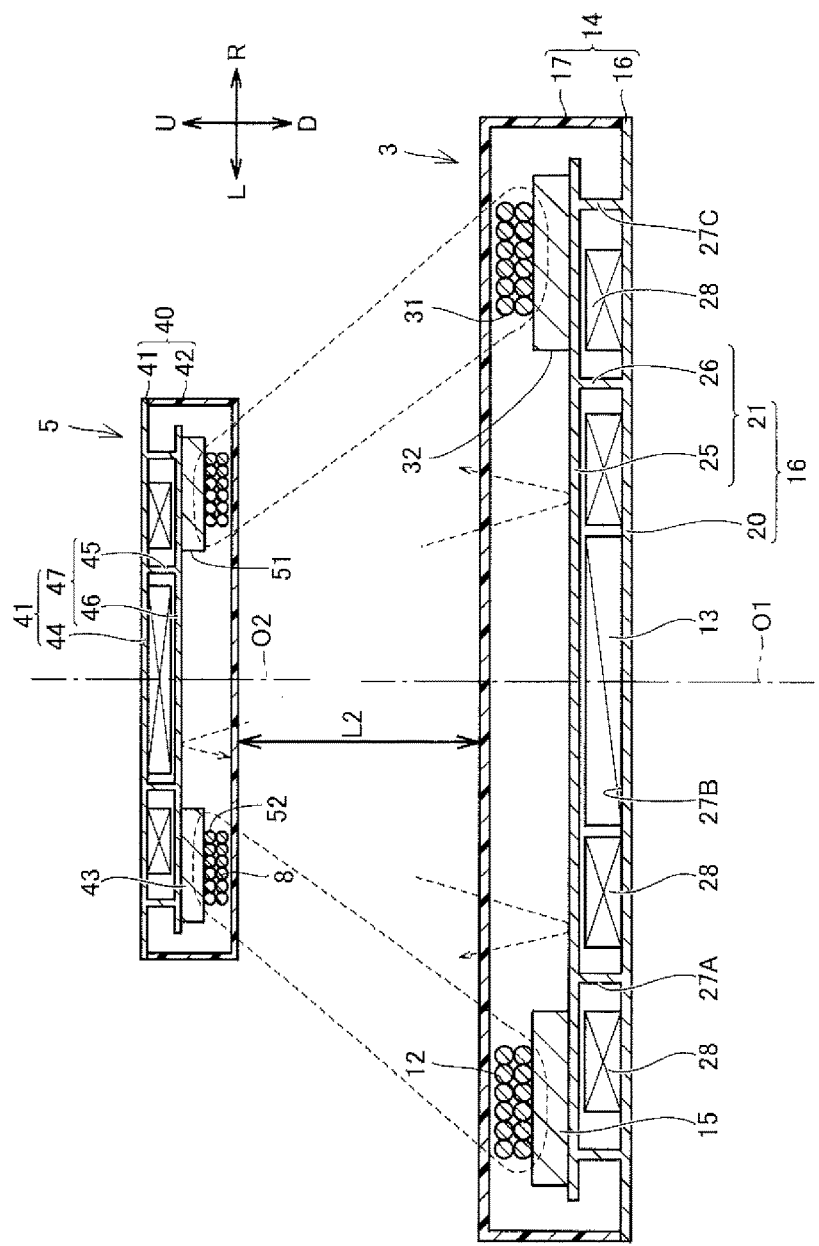
FIG. 12 is a cross-sectional view showing a state where electric power is transmitted from power transmission apparatus 3 to power reception apparatus 5 after power reception apparatus 5 has been brought closer to power transmission apparatus 3 than in the state shown in FIG. 9.

FIG. 12 is a cross-sectional view showing a state where electric power is transmitted from power transmission apparatus 3 to power reception apparatus 5 after power reception apparatus 5 has been brought closer to power transmission apparatus 3 than in the state shown in FIG. 9. In FIG. 12, the distance between power reception coil 8 and power transmission coil 12 is set to a distance L2 with winding axis O2 of power reception coil 8 coinciding with winding axis O1 of power transmission coil 12. Distance L2 is shorter than distance L1.

When electric power is supplied to power transmission coil 12 in the state shown in FIG. 12, magnetic flux MF is formed around power transmission coil 12. Here, since the distance between power transmission coil 12 and power reception coil 8 has decreased to reduce the gap between power transmission coil 12 and power reception coil 8, the magnetic resistance of the magnetic path through which magnetic flux MF passes decreases.

Accordingly, the amount of the magnetic flux passing between power reception coil 8 and power transmission coil 12 is larger than the amount of the magnetic flux passing between power reception coil 8 and power transmission coil 12 in the state shown in FIG. 9.

In contrast, as power reception coil 8 and power transmission coil 12 are closer to each other, magnetic flux MF entering flat portion 46 of power reception apparatus 5 exposed at opening 51 increases.

Here, since flat portion 46 is made of metal, the entry of magnetic flux MF into flat portion 46 causes an eddy current to be generated in the surface of flat portion 46. The eddy current causes a magnetic field to be generated. The magnetic field is distributed in a direction of reducing entering magnetic flux MF. As a result, magnetic flux MF entering flat portion 46 is reflected by flat portion 46.

Magnetic flux MF thus reflected by flat portion 46 is emitted to the outside without being guided to power reception coil 8.

As a result, power reception coil 8 receives electric power by magnetic flux MF entering ferrite core 43.

In addition, when power reception coil 8 and power transmission coil 12 are closer to each other, a part of magnetic flux MF returning from power reception coil 8 enters ceiling portion 25 in power transmission apparatus 3 as well.

In this case, too, since ceiling portion 25 is made of metal, the entry of magnetic flux MF into ceiling portion 25 causes an eddy current to flow in the surface of ceiling portion 25, causing magnetic flux MF to be reflected.

When magnetic flux MF is reflected in this manner, the length of the path through which magnetic flux MF returns to power transmission coil 12 increases.

As the length of the magnetic path increases in this manner, the magnetic resistance of the magnetic path increases, and the amount of the magnetic flux flowing through the path decreases.

Figure 13:
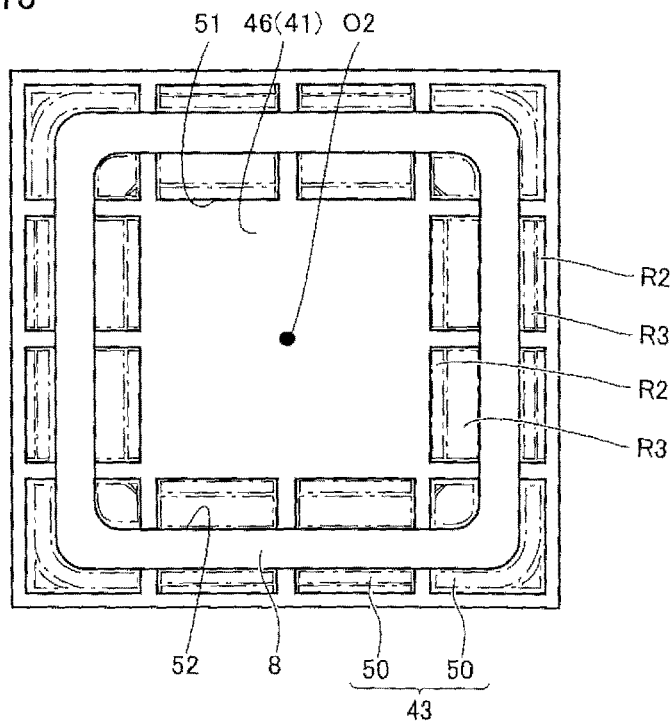
FIG. 13 is a plan view showing the distribution of magnetic strength in ferrite core 43 while power reception apparatus 5 receives electric power in the state shown in FIG. 12.

FIG. 13 is a plan view showing the distribution of magnetic strength in ferrite core 43 while power reception apparatus 5 receives electric power in the state shown in FIG. 12. In FIG. 13, a region R3 indicates a region of higher magnetic strength than region R2.

As shown in FIG. 13, in each divided core member 50, region R2 and region R3 are distributed in a portion located on an inner side of power reception coil 8. Region R3 is distributed along hollow 52 in power reception coil 8, and region R2 is located closer to winding axis O2 than region R3.

In each divided core member 50, region R2 and region R3 are also distributed in a portion located on an outer side of power reception coil 8. Region R3 is distributed along the outer peripheral edge of power reception coil 8, and region R2 is distributed on an outer side of region R3.

Figure 14:
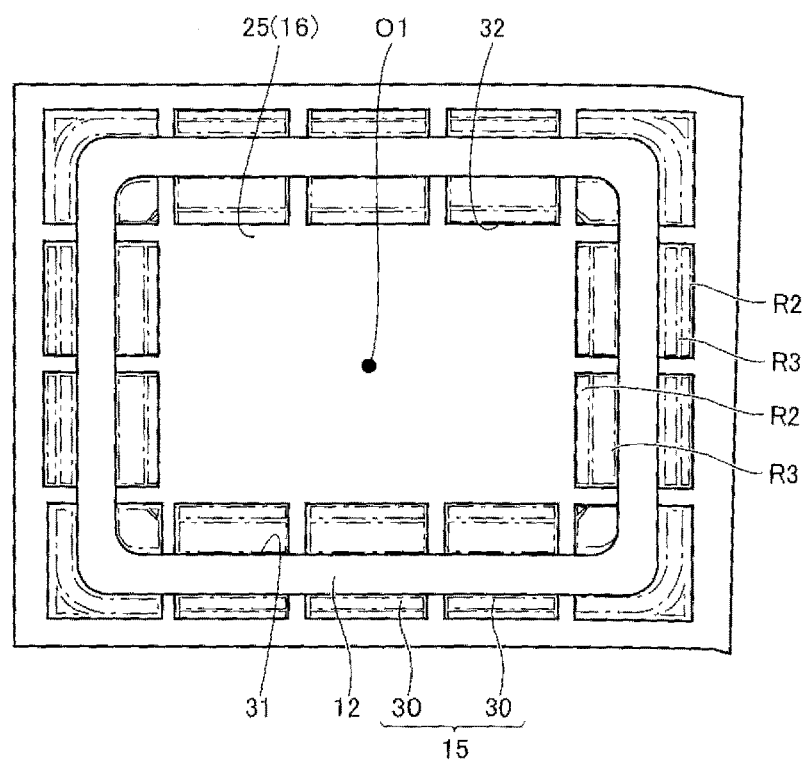
FIG. 14 is a plan view showing the distribution of magnetic strength in ferrite core 15 while power transmission apparatus 3 transmits electric power in the state shown in FIG. 12.

FIG. 14 is a plan view showing the distribution of magnetic strength in ferrite core 15 while power transmission apparatus 3 transmits electric power in the state shown in FIG. 12.

As shown in FIG. 14, in each divided core member 30, region R2 and region R3 are distributed in a portion located closer to winding axis O1 than power transmission coil 12. Region R3 is distributed along hollow 31 in power transmission coil 12. Region R2 is distributed closer to winding axis O1 than region R3.

In each divided core member 30, region R2 and region R3 are distributed in a portion located closer to the outer periphery than power transmission coil 12. Region R3 is distributed along the outer peripheral edge of power transmission coil 12. Region R2 is distributed on an outer side of region R3.

Figure 15:
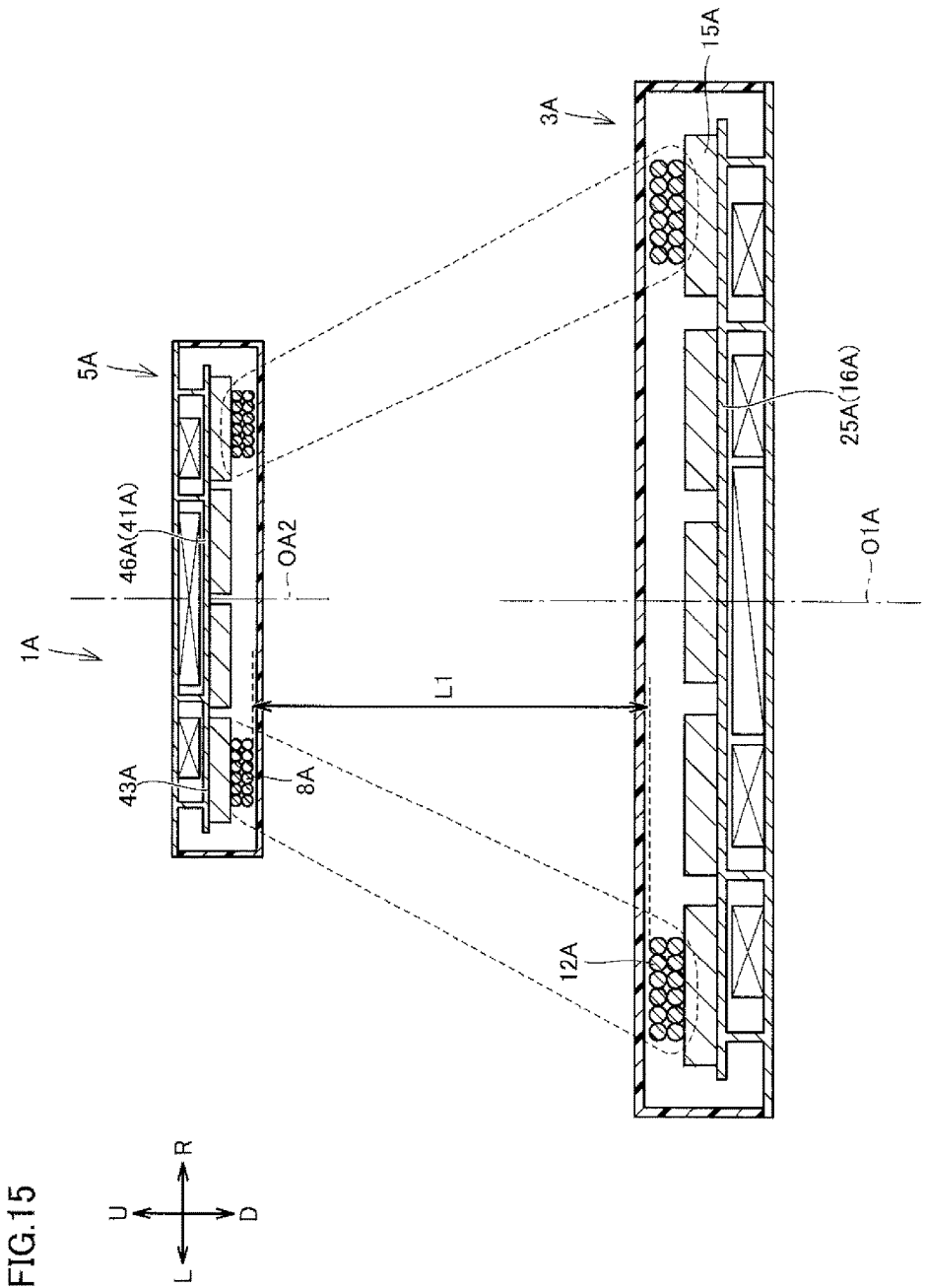
FIG. 15 is a cross-sectional view showing a wireless charging system 1A according to a comparative example.

Referring now to FIG. 15 and the like, the case where power transfer is performed using a power transmission apparatus 3A and a power reception apparatus 5A according to a comparative example and the case where power transfer is performed using power transmission apparatus 3 and power reception apparatus 5 according to this embodiment are compared and studied.

FIG. 15 is a cross-sectional view showing a wireless charging system 1A according to the comparative example. Wireless charging system 1A includes power transmission apparatus 3A and power reception apparatus 5A. Power transmission apparatus 3A includes a housing case 16A, a ferrite core 15A disposed on a ceiling portion 25A of housing case 16A, and a power transmission coil 12A disposed on ferrite core 15A. Power transmission coil 12A is formed by winding a coil wire to surround a winding axis O1A.

Power reception apparatus 5A includes a housing case 41A, a ferrite core 43A disposed on the lower surface of a flat portion 46A of housing case 41A, and a power reception coil 8A disposed on the lower surface of ferrite core 43A.

Power reception coil 8A is formed by winding a coil wire to surround a winding axis O2A.

Electric power is supplied to power transmission coil 12A, causing magnetic flux MF to be formed to pass through power transmission coil 12A and power reception coil 8A.

Figure 16:
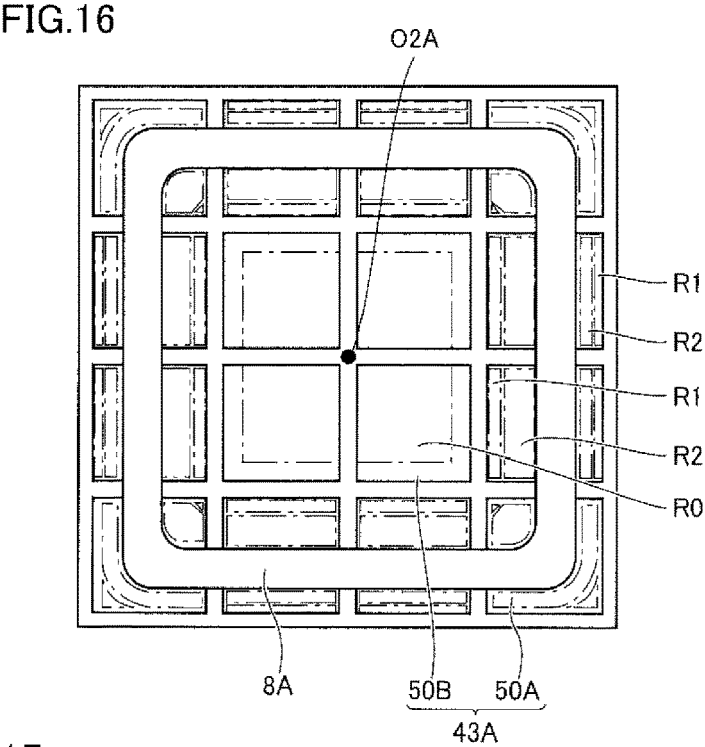
FIG. 16 is a plan view showing a ferrite core 43A of a power reception apparatus 5A.

FIG. 16 is a plan view showing ferrite core 43A of power reception apparatus 5A. As shown in FIG. 16, ferrite core 43A includes a plurality of divided core members 50A arranged annularly, and divided core members 50B disposed on an inner side of annularly arranged divided core members 50A.

In this manner, ferrite core 43A has divided core members 50B disposed in a portion corresponding to opening 51 shown in FIG. 10 and the like.

Figure 17:
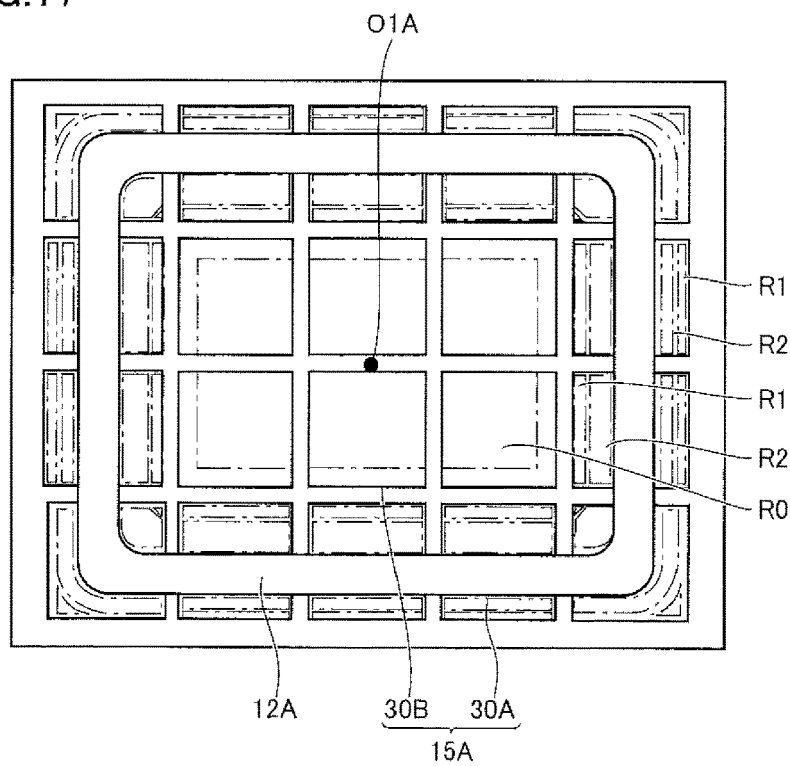
FIG. 17 is a plan view showing a ferrite core 15A of a power transmission apparatus 3A.

FIG. 17 is a plan view showing ferrite core 15A of power transmission apparatus 3A. As shown in FIG. 17, ferrite core 15A includes divided core members 30A arranged annularly, and a plurality of divided core members 30B disposed on an inner side of annularly arranged divided core members 30A.

In this manner, ferrite core 15A has divided core members 30B disposed in a portion corresponding to opening 32 shown in FIG. 11 and the like.

In FIG. 15, the distance between power transmission coil 12A and power reception coil 8A is distance L1, and power transmission coil 12A and power reception coil 8A are positionally aligned with each other.

Here, when electric power is supplied to power transmission coil 12A, magnetic flux MF flows between power transmission coil 12A and power reception coil 8A, and also flows through ferrite core 43A.

In FIG. 16, a region R0 indicates a region of lower magnetic strength than region R1. In each divided core member 50B, region R0 is distributed in a portion located in the vicinity of winding axis O2A, and region R1 is distributed on an outer side of region R0.

In each divided core member 50A, region R1 and region R2 are distributed in a portion located on an inner side of power reception coil 8A. Region R2 is distributed along hollow 52 in power reception coil 8A, and region R1 is located closer to winding axis O2A than region R2. In each divided core member 50A, region R2 is distributed along the outer periphery of power reception coil 8A, and region R1 is distributed on an outer side of region R2.

In FIG. 17, in each divided core member 30B, region R0 is distributed in the vicinity of winding axis O1A, and region R1 is distributed on an outer side of region R0.

In each divided core member 30A, region R1 and region R2 are distributed in a portion located closer to winding axis O1 than power transmission coil 12A. Region R2 is distributed along hollow 31 in power transmission coil 12A, and region R1 is distributed closer to winding axis O1A than region R2.

In each divided core member 30A, region R1 and region R2 are also distributed in a portion located on an outer side of power reception coil 12A. Region R2 is distributed along the outer peripheral edge of power transmission coil 12A, and region R1 is distributed on an outer side of region R2.

Here, a comparison is made between the distribution of magnetic strength shown in FIG. 16 and the distribution of magnetic strength shown in FIG. 10. The distribution of magnetic strength in divided core members 50 shown in FIG. 10 and the distribution of magnetic strength in divided core members 50A shown in FIG. 16 are almost identical to each other. It can be understood that, while magnetic flux MF also enters divided core members 50B shown in FIG. 16, the distribution of magnetic strength in divided core members 50B is low, with little magnetic flux MF flowing into and out of divided core members 50B.

A comparison is made between the distribution of magnetic strength in ferrite core 15A shown in FIG. 17 and the distribution of magnetic strength in ferrite core 15 shown in FIG. 11.

It can be understood that the distribution of magnetic strength in divided core members 30A shown in FIG. 17 and the distribution of magnetic strength in divided core members 30 shown in FIG. 11 are substantially identical to each other. In contrast, it can be understood that that the amount of the magnetic flux entering divided core members 30B shown in FIG. 17 is small.

In this manner, it can be understood that the amount of the magnetic flux passing through power reception coil 8 and power transmission coil 12 in FIG. 9 and the amount of the magnetic flux passing through power reception coil 8A and power transmission coil 12A in FIG. 15 are almost identical to each other. It can thus be understood that little difference occurs between the coupling coefficient between power reception coil 8 and power transmission coil 12 in FIG. 9 and the coupling coefficient between power reception coil 8A and power transmission coil 12A in FIG. 15.

Figure 18:
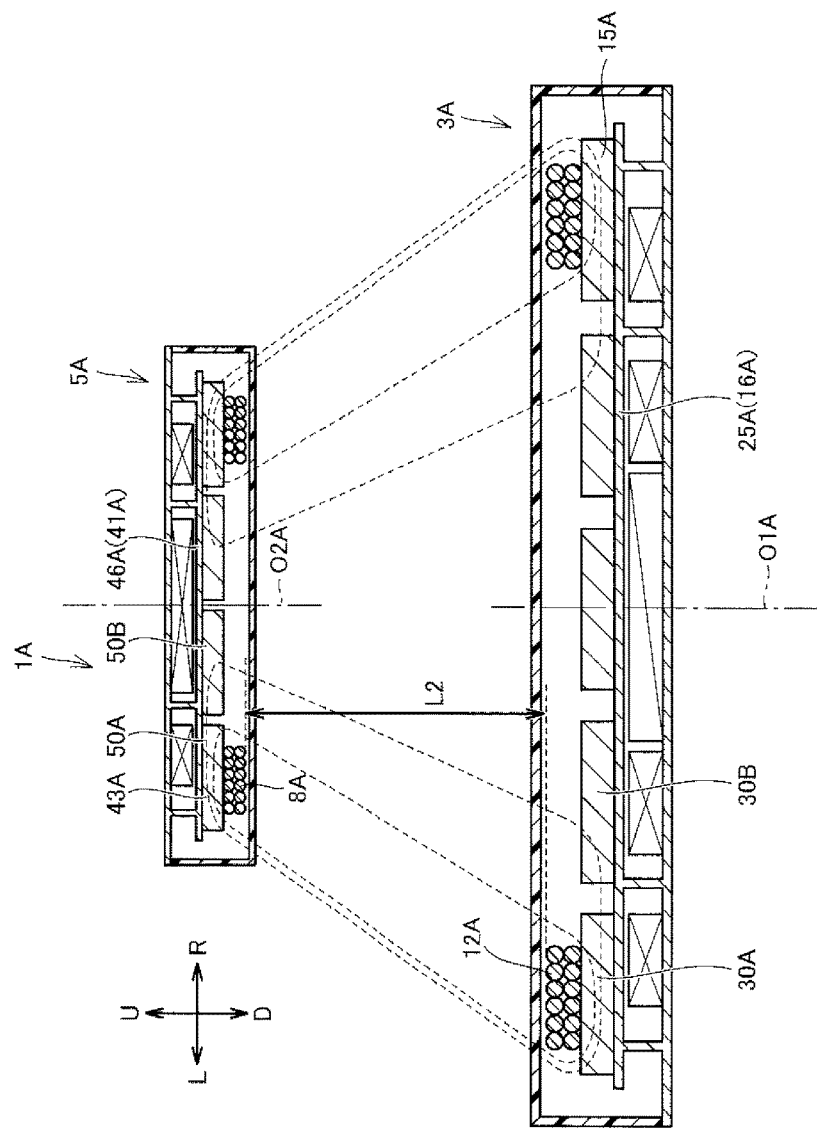
FIG. 18 is a cross-sectional view showing a state where the distance between a power transmission coil 12A and a power reception coil 8A is set to a distance L2 while power reception coil 8A and power transmission coil 12A are positionally aligned with each other.

Next, FIG. 18 is a cross-sectional view showing a state where the distance between power transmission coil 12A and power reception coil 8A is set to distance L2 while power reception coil 8A and power transmission coil 12A are positionally aligned with each other.

In FIG. 18, as power reception coil 8A and power transmission coil 12A are closer to each other, a large amount of magnetic flux MF flows between power reception coil 8A and power transmission coil 12A.

In FIG. 18, the magnetic flux passing through power transmission coil 12A and power reception coil 8A mainly follows two magnetic paths.

The first magnetic path successively passes through divided core members 30A, the gap, divided core members 50A, the gap, and divided core members 30A. The second magnetic path successively passes through divided core members 30A, the gap, divided core members 50A, divided core members 50B, the gap, divided core members 30B, and divided core members 30A.

Figure 19:
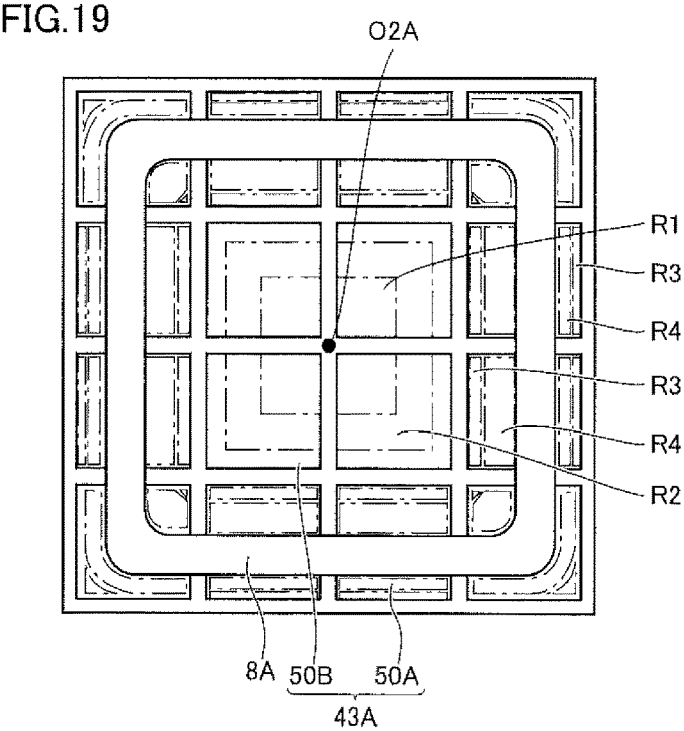
FIG. 19 is a plan view showing the distribution of magnetic strength in ferrite core 43A in the state shown in FIG. 18.

FIG. 19 is a plan view showing the distribution of magnetic strength in ferrite core 43A in the state shown in FIG. 18. In FIG. 19, a region R3 indicates a region of higher magnetic strength than region R2, and a region R4 indicates a region of higher magnetic strength than region R3. As shown in FIG. 19, region R1 is distributed in a portion of each divided core member 50B in the vicinity of winding axis O2A, and region R2 and region R3 are distributed on an outer side of region R1.

In each divided core member 50A, region R3 and region R4 are distributed on an inner side of power reception coil 8A. In each divided core member 50A, region R4 and region R3 are successively distributed in a portion located on an outer side of power reception coil 8A.

A comparison is now made between FIGS. 16 and 19. As a result, it can be understood that as the distance between power reception coil 8A and power transmission coil 12A decreases, the amount of the magnetic flux flowing through ferrite core 43A increases significantly.

One of the reasons that the above-described phenomenon occurs is that, since divided core members 50B are provided on ferrite core 43A, when power reception coil 8A and power transmission coil 12A are closer to each other, a path is formed through which magnetic flux MF enters divided core members 50B, interlinks with power reception coil 8A, then returns to power transmission coil 12A.

Figure 20:
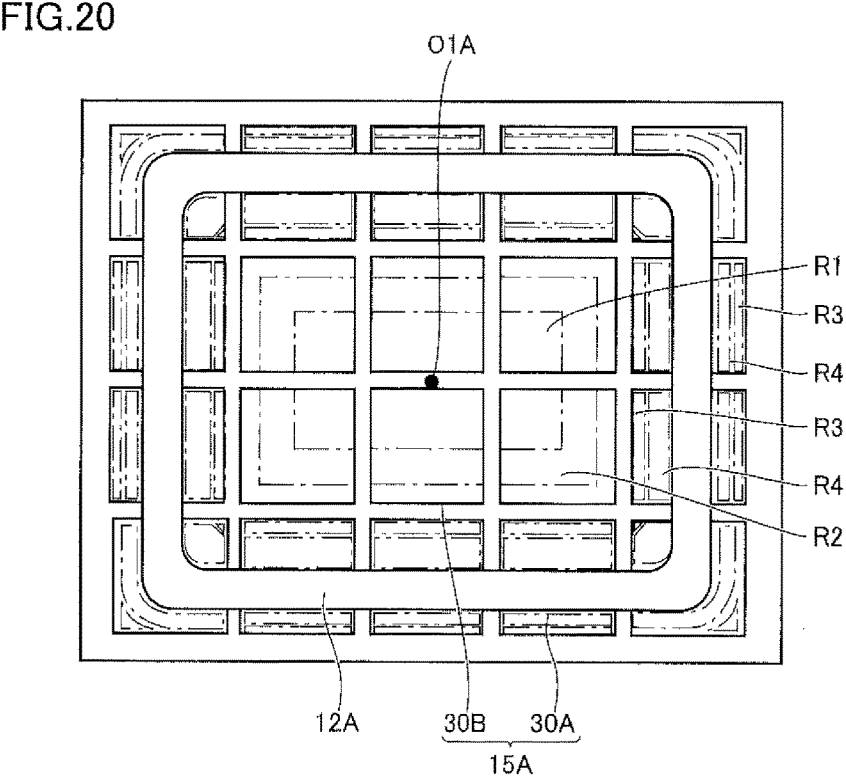
FIG. 20 is a plan view showing the distribution of magnetic strength in ferrite core 15A in the state shown in FIG. 18.

FIG. 20 is a plan view showing the distribution of magnetic strength in ferrite core 15A in the state shown in FIG. 18. As shown in FIG. 20, in each divided core member 30B, region R1 is distributed in a portion located around winding axis O1. Region R2 and region R3 are successively distributed around region R1. Furthermore, in each divided core member 30A, region R3 and region R4 are distributed in a portion located on an inner side of power transmission coil 12A. Region R4 is distributed along a hollow 31A in power transmission coil 12A, and region R3 is distributed closer to winding axis O1A than region R4.

In each divided core member 30A, region R3 and region R4 are distributed on an outer side of power transmission coil 12A. Region R4 is distributed along the outer peripheral edge of power transmission coil 12A, and region R3 is distributed on an outer side of region R4.

A comparison is now made between FIGS. 17 and 20. As a result, it can be understood that as the distance between power reception coil 8A and power transmission coil 12A decreases, the amount of the magnetic flux flowing through ferrite core 15A increases significantly.

This is because a magnetic path is formed through which magnetic flux MF formed by power transmission coil 12A passes through divided core members 30B toward power reception coil 8A, then returns to the outer peripheries of divided core members 30A.

As a result, it can be understood that in wireless charging system 1A according to the comparative example, as the distance between power reception coil 8A and power transmission coil 12A decreases, the coupling coefficient between power reception coil 8A and power transmission coil 12A increases.

A comparison is now made between the distribution of magnetic strength in ferrite core 43A shown in FIG. 19 and the distribution of magnetic strength in ferrite core 43 shown in FIG. 13.

First, portions of divided core members 50 and 50A located on an inner side of power reception coils 8 and 8A, respectively, are compared with each other. As a result, it can be understood that divided core members 50A have higher magnetic strength.

Then, portions of divided core members 50 and 50A located on an outer side of power reception coils 8 and 8A, respectively, are compared with each other. As a result, it can be understood that divided core members 50A have higher magnetic strength.

Furthermore, it can be understood that region R1, region R2 and region R3 are also distributed in divided core members 50B shown in FIG. 19, and a large amount of magnetic flux flows through divided core members 50B.

In other words, it can be understood that the amount of the magnetic flux flowing through ferrite core 43A shown in FIG. 19 is much larger than the amount of the magnetic flux flowing through ferrite core 43 shown in FIG. 13.

Next, a comparison is made between the distribution of magnetic strength in ferrite core 15A shown in FIG. 20 and the distribution of magnetic strength in ferrite core 15 shown in FIG. 14. As is obvious from FIGS. 20 and 14 as well, it can be understood that the amount of the magnetic flux flowing through ferrite core 15A is much larger than the amount of the magnetic flux flowing through ferrite core 15.

As is obvious from FIGS. 10, 11, 13, 14, 16, 17, 18 and 19, it can be understood that in wireless charging system 1A according to the comparative example, as the distance between power reception coil 8A and power transmission coil 12A decreases, the amount of the magnetic flux passing between power reception coil 8A and power transmission coil 12A increases, causing the coupling coefficient between the coils to vary such that the coefficient increases. In contrast, it can be understood that in wireless charging system 1 according to the first embodiment, as the distance between power reception coil 8 and power transmission coil 12 decreases, the amount of increase of the magnetic flux passing between power reception coil 8 and power transmission coil 12 is smaller than the amount of increase in the comparative example. It is thus understood that, when the distance between the coils decreases, the amount of variation (the amount of increase) of the coupling coefficient is smaller in wireless charging system 1 according to the first embodiment than in the comparative example.

This is because, in wireless charging system 1 according to this embodiment, as is obvious from FIG. 12 as well, when the distance between power transmission coil 12 and power reception coil 8 decreases, magnetic flux MF is reflected by flat portion 46 exposed at opening 51, and magnetic flux MF is reflected by ceiling portion 25 exposed at opening 32.

This is also because, in wireless charging system 1A according to the comparative example, in contrast, when the distance between power transmission coil 12A and power reception coil 8A decreases, magnetic flux MF entering a hollow 52A and hollow 31A can pass through divided core members 30B and 50B, and flow between power transmission coil 12A and power reception coil 8A.

In this manner, in wireless charging system 1 according to the first embodiment, even when the vehicle height of vehicle 2 varies as the user loads baggage into vehicle 2 or removes baggage from vehicle 2 after vehicle 2 comes to rest and charging is started in FIG. 1, for example, variation of the coupling coefficient can be suppressed.

In power transmission apparatus 3, the magnetic flux is reflected by ceiling portion 25 which is a portion of housing case 16, thus suppressing variation of the coupling coefficient. Housing case 16 suppresses leakage of noise from low-voltage device 28 and the like housed therein to the outside, and a portion of housing case 16 is utilized as a metal member to reflect the magnetic flux. Accordingly, there is no need to provide a metal member other than housing case 16, thus allowing a reduction in the number of components.

Similarly, in power reception apparatus 5, a part of the magnetic flux from power transmission coil 12 is reflected using a portion of housing case 41 that suppresses leakage of noise from devices 49 to the outside. Therefore, there is no need to provide a member to reflect the magnetic flux other than housing case 41 in power reception apparatus 5 as well, thus allowing a reduction in the number of components.

Second Embodiment

Figure 21:
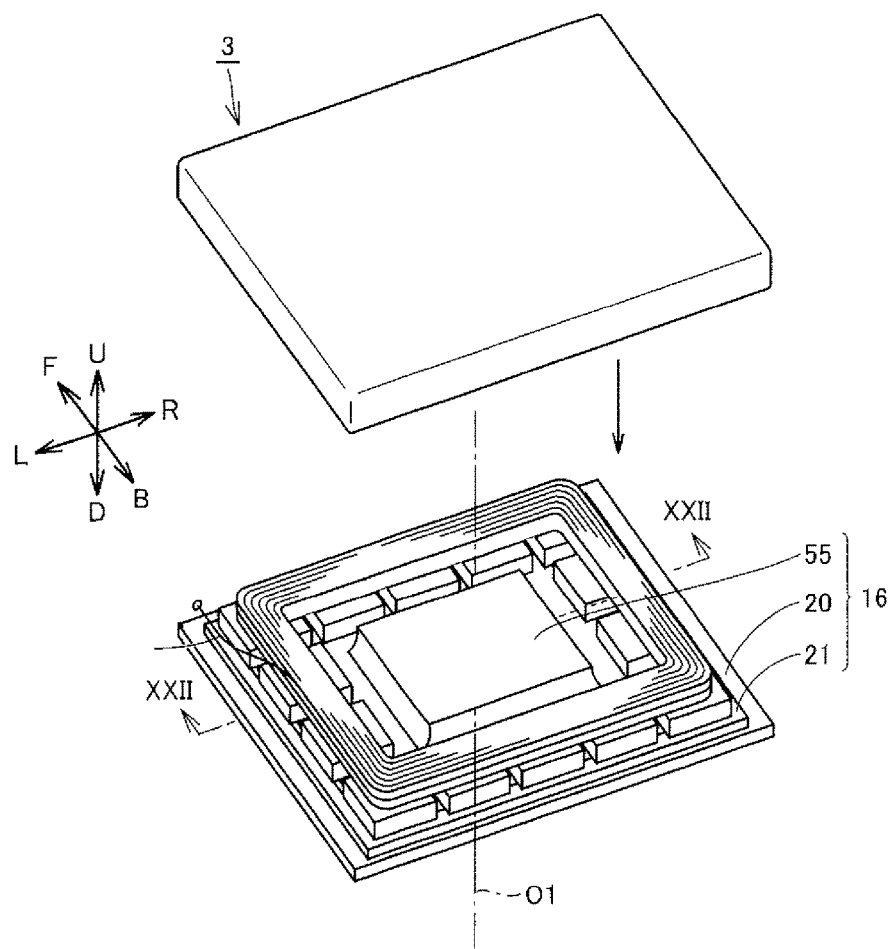
FIG. 21 is a perspective view showing power transmission apparatus 3 according to a second embodiment.

Referring to FIG. 21 and the like, power transmission apparatus 3 and power reception apparatus 5 according to a second embodiment are described. Any feature shown in FIG. 21 and the like identical or substantially identical to the corresponding one shown in FIGS. 1 to 20 described above is denoted by the same reference character, and the description thereof may not be repeated.

FIG. 21 is a perspective view showing power transmission apparatus 3 according to the second embodiment. As shown in FIG. 21, housing case 16 includes base plate 20, and housing portion 21 formed on the upper surface of base plate 20. A protruding portion 55 is formed in housing portion 21.

Figure 22:
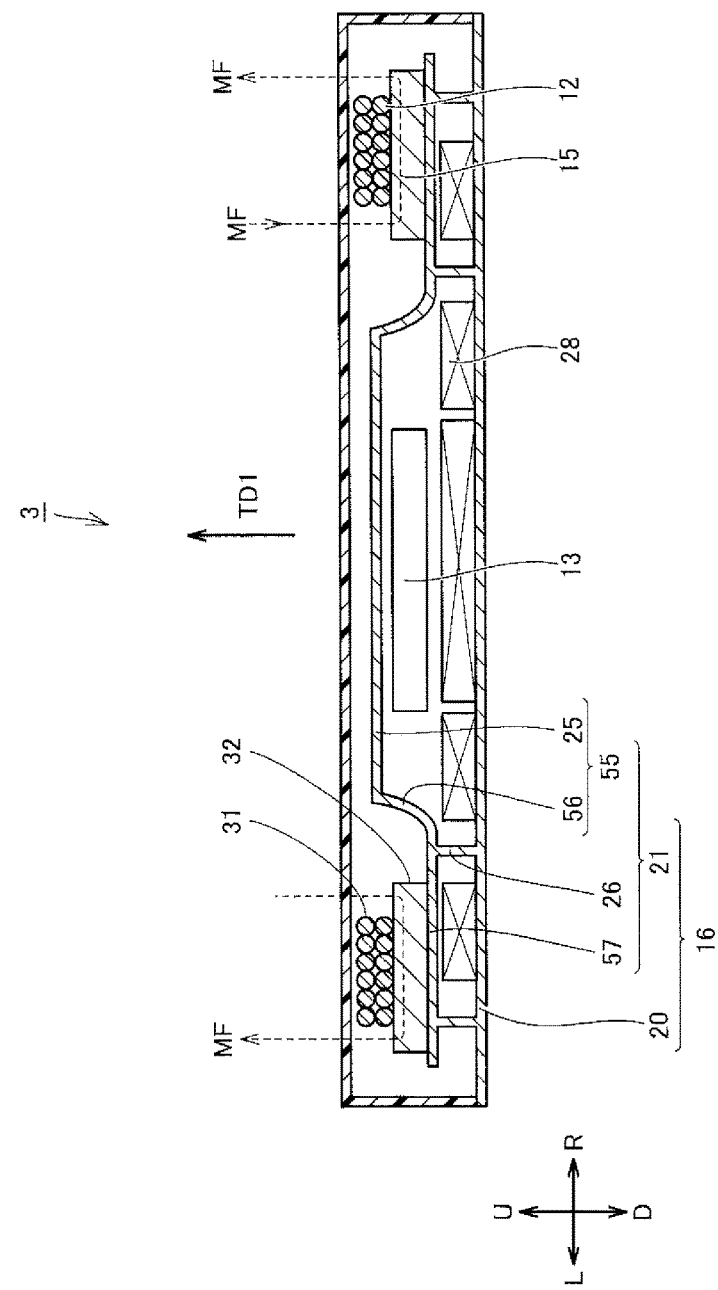
FIG. 22 is a cross-sectional view along a line XXII-XXII shown in FIG. 21.

FIG. 22 is a cross-sectional view along a line XXII-XXII shown in FIG. 21. As shown in FIG. 22, housing portion 21 includes a flat portion 57 having an upper surface on which ferrite core 15 is disposed, protruding portion 55 formed in a central region of flat portion 57 and protruding upward, and a plurality of compartment walls 26 formed on the lower surface of flat portion 57.

Protruding portion 55 includes ceiling portion 25, and a peripheral wall portion 56 vertically suspended from the outer peripheral edge of ceiling portion 25 and connected to flat portion 57. Protruding portion 55 is formed to protrude toward hollow 31 from opening 32, and is located in opening 32 and hollow 31. Protruding portion 55 is disposed such that winding axis O1 passes through a central region of protruding portion 55.

Peripheral wall portion 56 is formed as a curved surface so as to project toward winding axis O1 located in the central region of protruding portion 55. Here, peripheral wall portion 56 is formed annularly, and is fainted such that the width of protruding portion 55 in a direction perpendicular to winding axis O1 decreases toward electric power transmission direction TD1.

Protruding portion 55 made as described above is formed to have a hollow shape. In the example shown in FIG. 22, capacitor 13, frequency converter 11 and low-voltage device 28 are disposed in protruding portion 55.

By housing frequency converter 11 as well in housing portion 21, the footprint of power transmission apparatus 3 can be reduced as is obvious from FIG. 21 as well.

Figure 23:
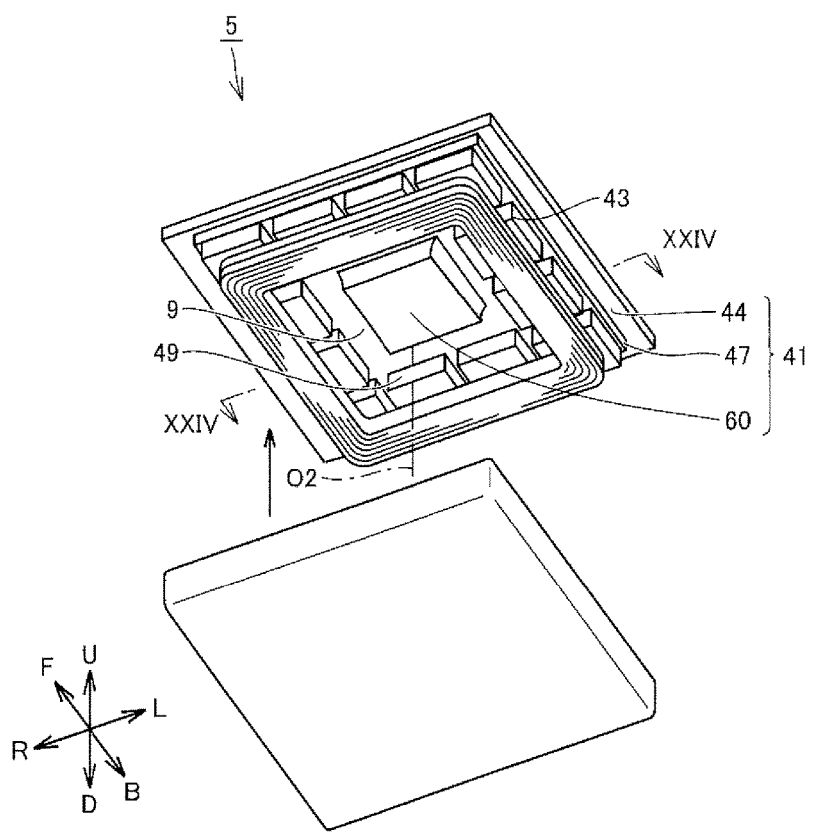
FIG. 23 is an exploded perspective view showing power reception apparatus 5.

FIG. 23 is an exploded perspective view showing power reception apparatus 5. As shown in FIG. 23, housing case 41 includes base plate 44, housing portion 47 formed on the lower surface of base plate 44, and a protruding portion 60 formed in housing portion 47.

Figure 24:
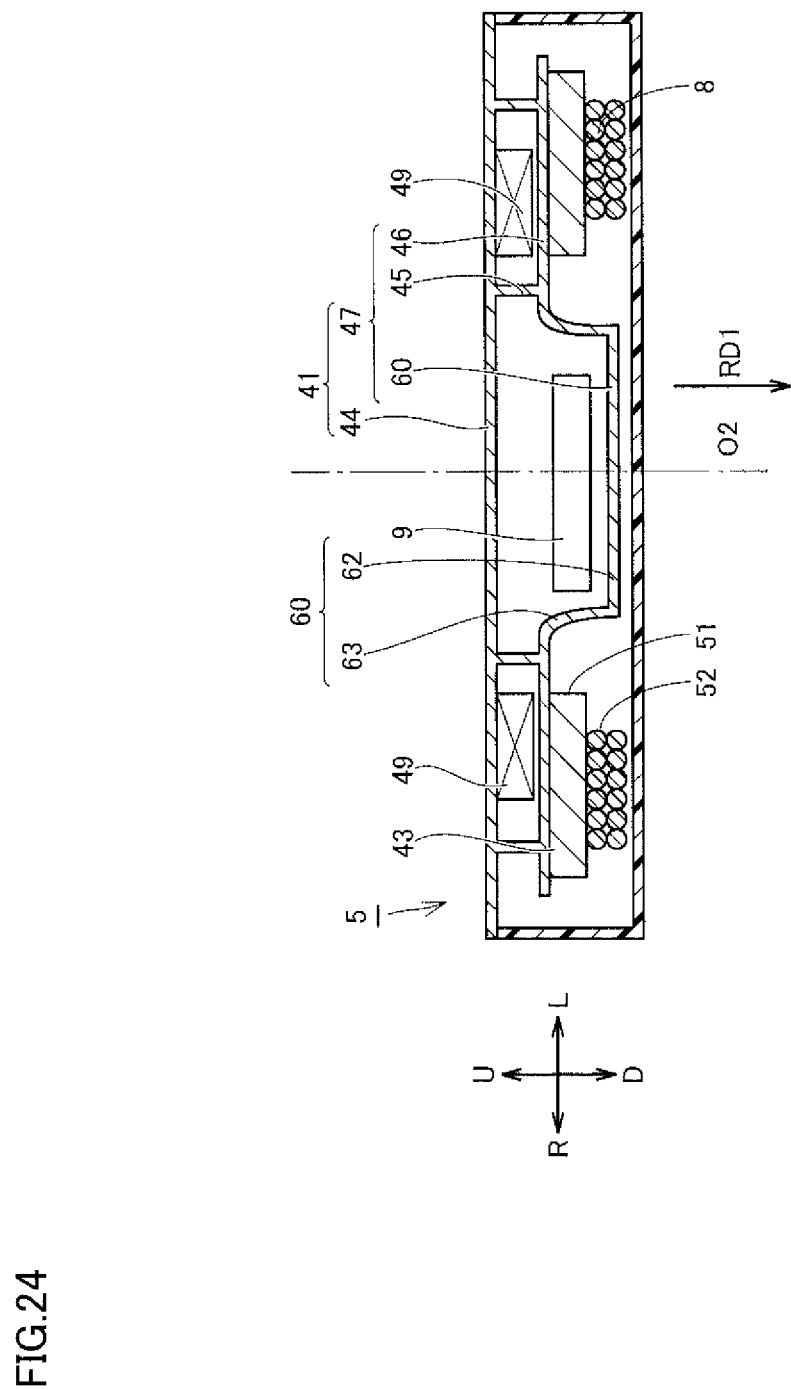
FIG. 24 is a cross-sectional view along a line XXIV-XXIV shown in FIG. 23.

FIG. 24 is a cross-sectional view along a line XXIV-XXIV shown in FIG. 23. As shown in FIG. 24, housing case 41 includes base plate 44, and housing portion 47 formed on the lower surface of base plate 44. Housing portion 47 includes flat portion 46 having a lower surface on which ferrite core 43 is disposed, protruding portion 60 protruding downward from a central region of flat portion 46, and compartment wall 45 formed on the upper surface of flat portion 46 and connecting base plate 44 to flat portion 46. Protruding portion 60 protrudes toward hollow 52 from opening 51. When protruding portion 60 is seen in a direction along winding axis O2, protruding portion 60 is located in opening 51. Protruding portion 60 is formed such that winding axis O2 is located in a central region of protruding portion 60.

Protruding portion 60 includes a bottom surface portion 62, and a peripheral wall portion 63 extending upward from the outer peripheral edge of bottom surface portion 62 and connected to flat portion 46.

Peripheral wall portion 63 is formed annularly. Peripheral wall portion 63 is formed as a curved surface so as to project toward the central region of protruding portion 60. The width of protruding portion 60 decreases toward electric power reception direction RD1. Power reception coil 8 is disposed such that winding axis O2 is along electric power reception direction RD1.

Protruding portion 60 made as described above is formed to have a hollow shape. In the example shown in FIG. 24, capacitor 9 and the plurality of devices 49 are housed in protruding portion 60. By forming protruding portion 60 in this manner, a space for housing the devices can be ensured to reduce the footprint of power reception apparatus 5.

The description will be given of a case where power transfer is performed between power transmission apparatus 3 and power reception apparatus 5 configured as described above.

As shown in FIG. 22, protruding portion 55 is exposed at opening 32. In addition, as shown in FIG. 24, protruding portion 60 is exposed at opening 51. Accordingly, in wireless charging system 1 according to the second embodiment, too, even when the distance between power reception coil 8 and power transmission coil 12 varies, variation of the coupling coefficient between power reception coil 8 and power transmission coil 12 can be suppressed as in the first embodiment described above.

Here, when electric power is transmitted from power transmission apparatus 3 to power reception apparatus 5, magnetic flux MF flows in and out through a portion of ferrite core 15 located on an inner side of power transmission coil 12 as well, as shown in FIG. 22. Magnetic flux MF is emitted from opening 32 in ferrite core 15 as well, and magnetic flux MF follows a curved upward path as it moves away from the inner surface of opening 32 in the horizontal direction.

Meanwhile, as shown in FIG. 22, peripheral wall portion 56 is also formed as a curved surface along the path of magnetic flux MF described above. Accordingly, the entry of magnetic flux MF into peripheral wall portion 56 is suppressed.

Similarly, when power reception apparatus 5 receives electric power, magnetic flux MF flows in and out through the inner surface of opening 51 in ferrite core 43 as shown in FIG. 24. Magnetic flux MF follows a curved downward path as it moves away from the inner peripheral surface of ferrite core 43 in the horizontal direction.

Meanwhile, since peripheral wall portion 63 is also formed as a curved surface along the path of magnetic flux MF described above, the entry of magnetic flux MF into peripheral wall portion 63 can be suppressed.

In the first and second embodiments described above, the magnetic flux is reflected by exposing a portion of each of housing cases 16 and 41 made of metal, thereby suppressing variation of the coupling coefficient between the power transmission coil and the power reception coil. Accordingly, leakage of noise generated from the various devices housed in housing cases 16 and 41 to the outside can be suppressed, and variation of the coupling coefficient can be suppressed without using a new metal member. The configuration to reflect the magnetic flux does not need to be a portion of each housing case. It is only required that a piece of metal (metal member) be disposed in the hollow in the power reception coil, and in the opening in the ferrite.

Figure 25:
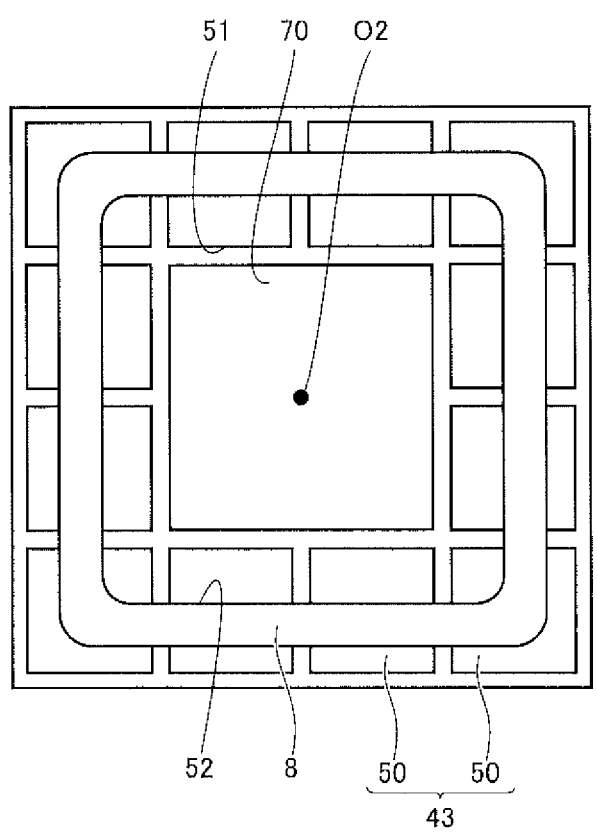
FIG. 25 is a plan view schematically showing a modification of power reception apparatus 5.

FIG. 25 is a plan view schematically showing a modification of power reception apparatus 5. As shown in FIG. 25, power reception apparatus 5 includes ferrite core 43 having opening 51 formed therein, power reception coil 8 disposed on the lower surface of ferrite core 43 and having hollow 52 formed in the center thereof, and a piece of metal 70.

When piece of metal 70, ferrite core 43 and power reception coil 8 are seen in plan view from below piece of metal 70, ferrite core 43 and power reception coil 8, piece of metal 70 is located in opening 51.

Figure 26:
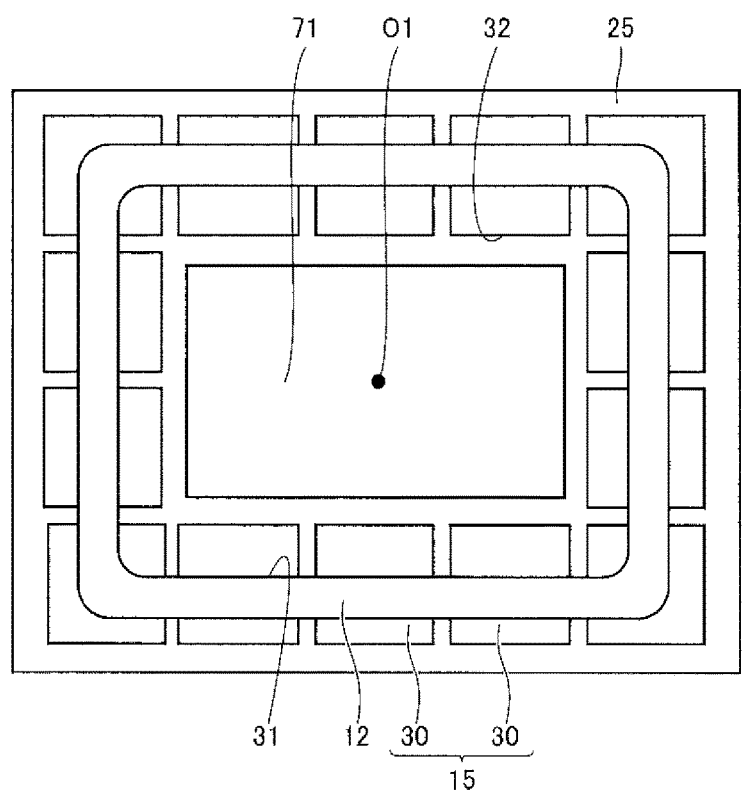
FIG. 26 is a plan view showing a modification of power transmission apparatus 3.

FIG. 26 is a plan view showing a modification of power transmission apparatus 3. As shown in FIG. 26, power transmission apparatus 3 includes ferrite core 15 having opening 32 formed in the central region thereof, power transmission coil 12 disposed on the upper surface of ferrite core 15, and a piece of metal 71.

When piece of metal 71, ferrite core 15 and power transmission coil 12 are seen in plan view from above piece of metal 71, ferrite core 15 and power transmission coil 12, piece of metal 71 is located in opening 32.

Piece of metal 70 and piece of metal 71 are made of, for example, aluminum or copper. Since these metals have low electrical resistance to magnetic flux, a large eddy current flows upon entry of magnetic flux MF, thereby increasing the strength of a magnetic field formed by the eddy current. Accordingly, magnetic flux MF can be reflected appropriately by piece of metal 70 and piece of metal 71.

Since piece of metals 70 and 71 can reflect magnetic flux MF in this manner, even when the distance between the coils in the top-bottom direction varies, variation of the coupling coefficient between power transmission coil 12 and power reception coil 8 can be suppressed, as in the first and second embodiments described above.

Third Embodiment

In the first and second embodiments described above, variation of the coupling coefficient is suppressed by reflecting the magnetic flux entering the hollow in each coil. The method of suppressing variation of the coupling coefficient is not limited to the above-described approach.

Figure 27:
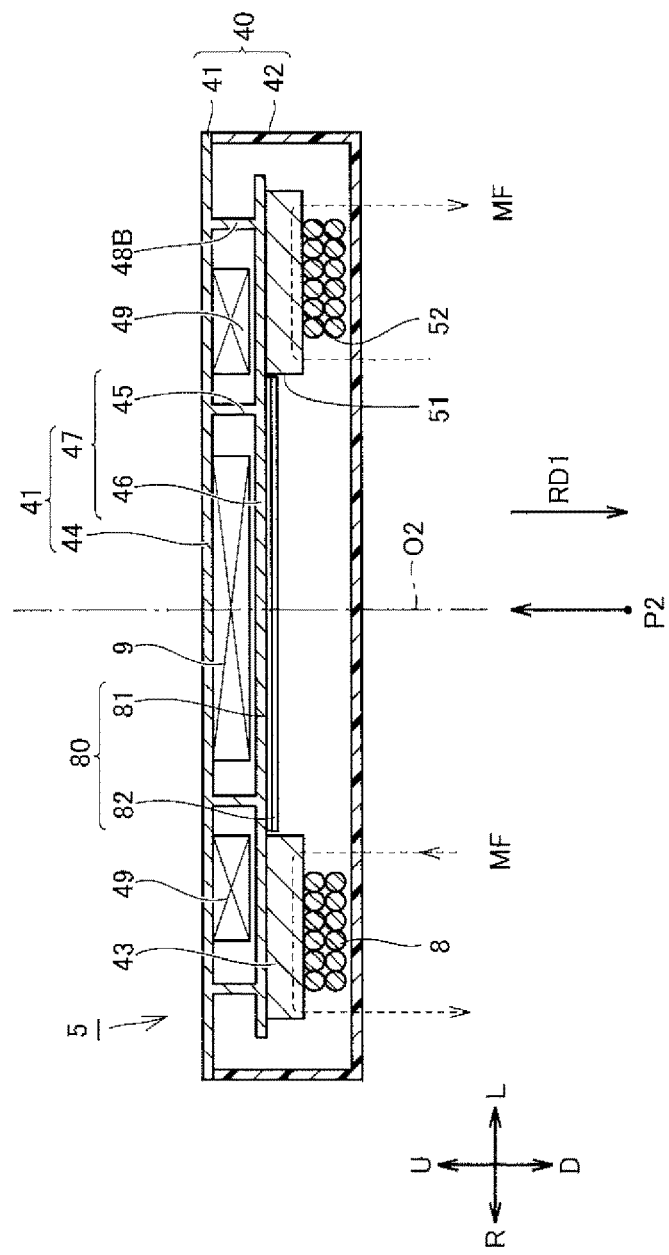
FIG. 27 is a cross-sectional view showing power reception apparatus 5 according to a third embodiment.

Referring to FIG. 27 and the like, a power transmission apparatus and a power reception apparatus according to the third embodiment is described. Any feature identical or substantially identical to the corresponding one shown in FIGS. 21 to 26 described above is denoted by the same reference character, and the description thereof may not be repeated.

FIG. 27 is a cross-sectional view showing power reception apparatus 5 according to the third embodiment. As shown in FIG. 27, power reception apparatus 5 includes a magnetic sheet 80 disposed on the lower surface of flat portion 46 which is exposed at opening 51.

Magnetic sheet 80 includes an adhesive layer 81 adhered to the lower surface of flat portion 46, and a magnetic layer 82 formed on the lower surface of adhesive layer 81.

Here, magnetic layer 82 has a thickness much smaller than the thickness of divided core members 50 (ferrite core 43). Thus, the area of a flow path through which magnetic flux MF entering magnetic layer 82 can flow toward ferrite core 43 is much smaller than the area of a flow path through which magnetic flux MF can flow through divided core members 50. Therefore, the magnetic resistance when magnetic flux MF flows through magnetic layer 82 is higher than the magnetic resistance when magnetic flux MF flows through divided core members 50.

A ferrite material forming magnetic layer 82 may be different from a ferrite material forming divided core members 50. Specifically, the magnetic permeability of the ferrite material forming magnetic layer 82 is set to be lower than the magnetic permeability of the ferrite material funning divided core members 50. For example, magnetic layer 82 is made of zinc-nickel ferrite, and divided core members 50 are made of zinc-manganese ferrite.

Figure 28:
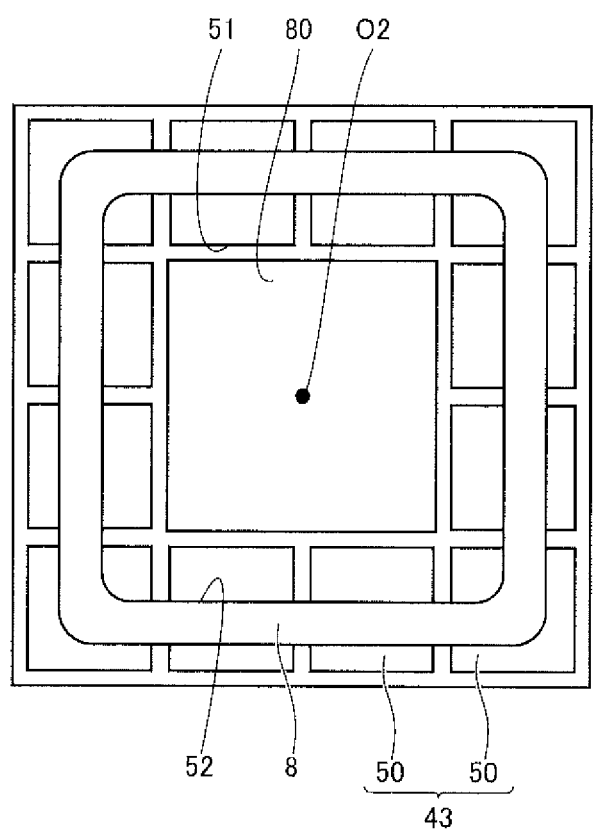
FIG. 28 is a plan view of a magnetic sheet 80, power reception coil 8 and ferrite core 43 as seen from below magnetic sheet 80, power reception coil 8 and ferrite core 43.

FIG. 28 is a plan view of magnetic sheet 80, power reception coil 8 and ferrite core 43 as seen from below magnetic sheet 80, power reception coil 8 and ferrite core 43. As shown in FIG. 28, magnetic sheet 80 is located in hollow 52 in power reception coil 8, and in opening 51 in ferrite core 43.

Accordingly, during power transfer, magnetic flux MF entering opening 51 enters magnetic sheet 80. Magnetic flux MF follows a path which successively passes through magnetic sheet 80, the inner peripheral surface of ferrite core 43, divided core members 50, and the outer peripheral edges of divided core members 50, then returning to power transmission coil 12.

However, since magnetic layer 82 of magnetic sheet 80 has higher magnetic resistance than that of ferrite core 43, the above-described magnetic path has high magnetic resistance. Therefore, the amount of the magnetic flux passing through the above-described magnetic path is small.

Therefore, even when the distance between power reception coil 8 and power transmission coil 12 decreases, an increase in the amount of the magnetic flux passing through opening 51 can be suppressed. As a result, even when the distance between power reception coil 8 and power transmission coil 12 decreases, an increase in the amount of the magnetic flux penetrating power reception coil 8 can be suppressed, thereby suppressing an increase in the coupling coefficient as compared to the comparative example described above.

Magnetic layer 82 of magnetic sheet 80 is made of ferrite, and has electrical resistance much higher than that of aluminum or copper. Thus, little eddy current flows even when magnetic flux MF enters magnetic sheet 80. Therefore, little heat is generated by the eddy current, thereby preventing magnetic sheet 80 itself from reaching a high temperature.

Figure 29:
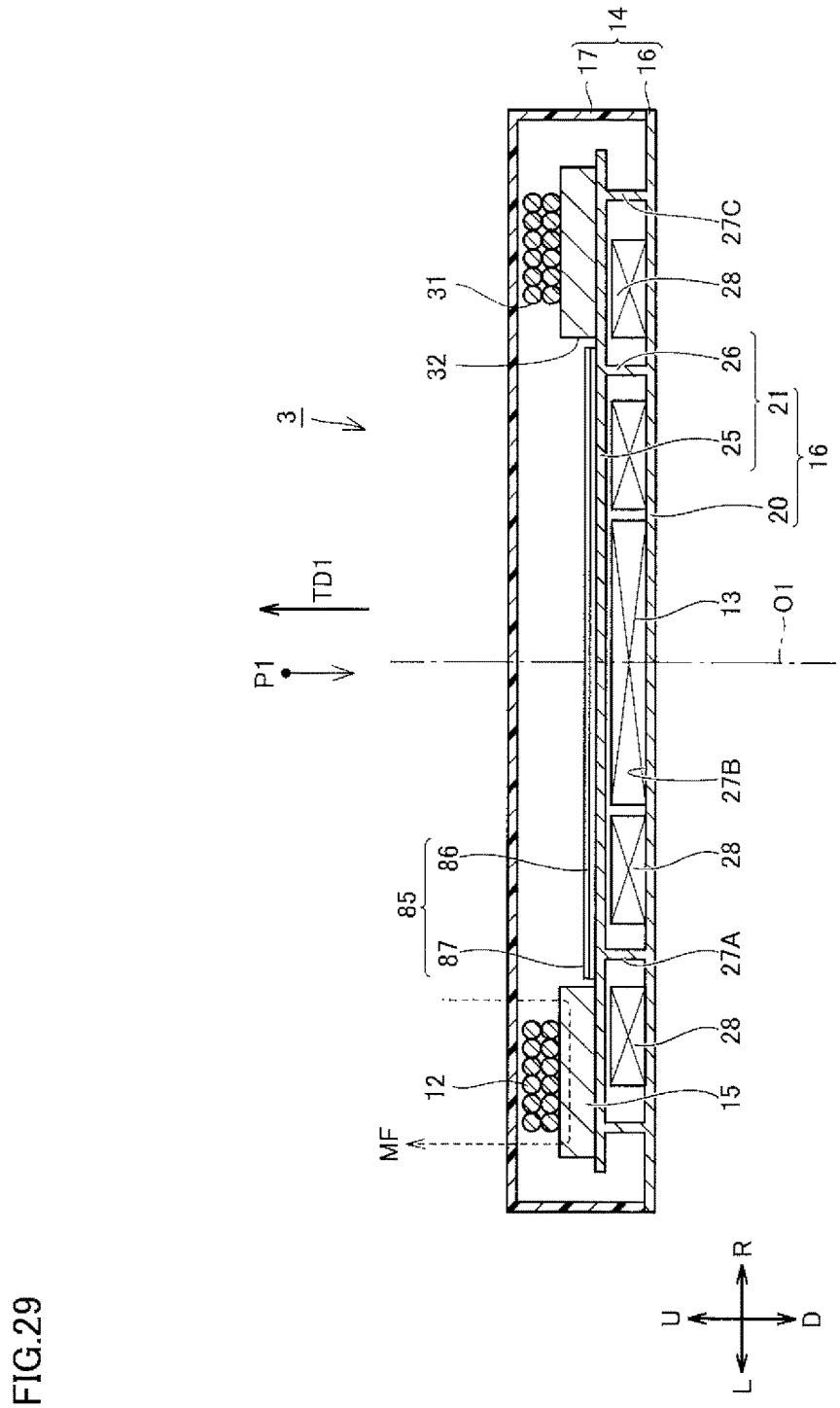
FIG. 29 is a cross-sectional view showing power transmission apparatus 3 according to the third embodiment.

FIG. 29 is a cross-sectional view showing power transmission apparatus 3 according to the third embodiment. As shown in FIG. 29, power transmission apparatus 3 includes a magnetic sheet 85 provided on the upper surface of ceiling portion 25. Magnetic sheet 85 includes an adhesive layer 86, and a magnetic layer 87 formed on the upper surface of adhesive layer 86.

Magnetic layer 87 has a thickness much smaller than the thickness of divided core members 30. Thus, a flow area in which magnetic flux MF can pass through magnetic layer 87 is smaller than a flow area of magnetic flux MF when magnetic flux MF flows through divided core members 30.

Therefore, the magnetic resistance when magnetic flux MF passes through magnetic layer 87 is much higher than the magnetic resistance of divided core members 30 when magnetic flux MF flows through divided core members 30.

Figure 30:
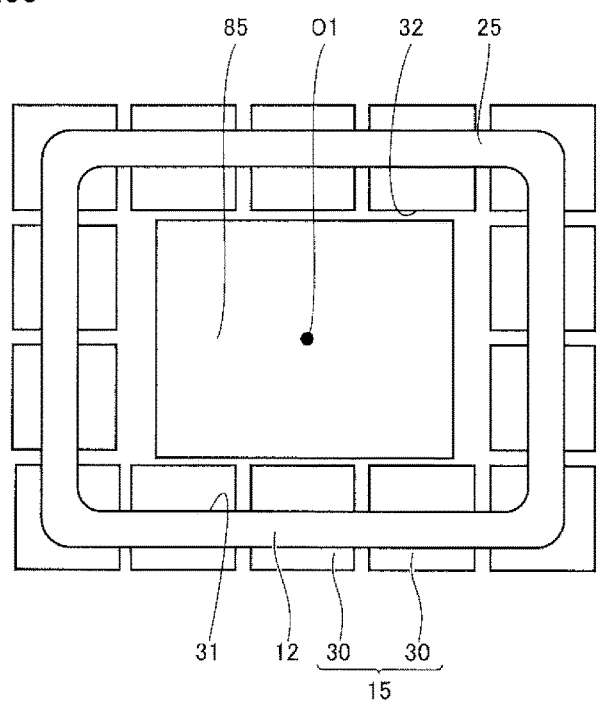
FIG. 30 is a plan view as seen from position P1 located above a magnetic sheet 85, power transmission coil 12 and ferrite core 15.

FIG. 30 is a plan view of magnetic sheet 85, power transmission coil 12 and ferrite core 15 as seen from position P1 located above magnetic sheet 85, power transmission coil 12 and ferrite core 15. As shown in FIG. 30, magnetic sheet 85 is located in hollow 31 in power transmission coil 12, and in opening 32 in ferrite core 15.

Accordingly, magnetic flux MF entering opening 32 enters magnetic sheet 85.

Since magnetic sheet 85 has higher magnetic resistance than that of divided core members 30 as described above, the magnetic resistance of a path which passes through magnetic sheet 85, the inner peripheral surfaces of divided core members 30, divided core members 30 and the outer peripheral edges of divided core members 30 increases.

Therefore, even when power transmission coil 12 and power reception coil 8 are closer to each other, an increase in the magnetic flux passing through opening 32, power transmission coil 12 and power reception coil 8 can be suppressed.

Accordingly, even when power transmission coil 12 and power reception coil 8 are displaced such that they are closer to each other from positions spaced a prescribed distance from each other, variation of the coupling coefficient between power transmission coil 12 and power reception coil 8 can be suppressed as compared to the comparative example described above.

This embodiment has described an example where the magnetic sheet is employed as a high-resistance member having higher magnetic resistance during the passage of the magnetic flux than that of ferrite cores 15 and 43, the high-resistance member having higher magnetic resistance is not limited to the magnetic sheet, but a neodymium magnet or the like may be disposed.

Although embodiments have been described, it should be understood that the embodiments disclosed herein are illustrative and non-restrictive.

What is claimed is:

1. A power transmission apparatus comprising:
   a power transmission coil which includes a first main surface and a second main surface located opposite the first main surface in an electric power transmission direction, and which has a hollow formed in a center of the power transmission coil;
   a ferrite core disposed at the second main surface of the power transmission coil and having an opening formed therein, the opening located in the hollow when the power transmission coil is viewed in a direction in which a winding axis of the power transmission coil extends; and
   a metal member which is disposed in a space formed by the hollow and the opening, and which is located in the opening when the power transmission coil is viewed in the direction in which the winding axis of the power transmission coil extends, the metal member including a protruding portion protruding toward the hollow from the opening, the protruding portion having a hollow shape.

2. The power transmission apparatus according to claim 1, further comprising:
   a device connected to the power transmission coil; and
   a housing case made of metal in which the device is housed, wherein
   at least a portion of the metal member is the housing case.

3. The power transmission apparatus according to claim 2, wherein
   the protruding portion includes a peripheral surface, and a ceiling portion formed at a tip portion of the peripheral surface, and
   the peripheral surface of the protruding portion is a curved surface that projects toward a central region of the protruding portion, and a width of the protruding portion in a direction perpendicular to the winding axis of the power transmission coil decreases as the protruding portion extends toward the electric power transmission direction.

4. A power transmission apparatus comprising:
   a power transmission coil which includes a first main surface and a second main surface located opposite the first main surface in an electric power transmission direction, and which has a hollow formed in a center of the power transmission coil;
   a ferrite core disposed at the second main surface of the power transmission coil and having an opening formed therein, the opening located in the hollow when the power transmission coil is viewed in a direction in which a winding axis of the power transmission coil extends; and
   a high-resistance member which is disposed in a space formed by the hollow and the opening, which is located in the opening when the power transmission coil is viewed in the direction in which the winding axis of the power transmission coil extends, and which has a higher magnetic resistance than a magnetic resistance of the ferrite core.

5. A power reception apparatus comprising:
   a power reception coil which includes a first main surface and a second main surface located opposite the first main surface in an electric power reception direction, and which has a hollow formed in a center of the power reception coil;
   a ferrite core disposed at the second main surface of the power reception coil and having an opening formed therein, the opening located in the hollow when the power reception coil is viewed in a direction in which a winding axis of the power reception coil extends; and
   a metal member which is disposed in a space formed by the hollow and the opening, and which is located in the opening when the power reception coil is viewed in the direction in which the winding axis of the power reception coil extends, the metal member including a protruding portion protruding toward the hollow from the opening, the protruding portion having a hollow shape.

6. The power reception apparatus according to claim 5, further comprising:
   a device connected to the power reception coil; and
   a housing case made of metal in which the device is housed, wherein
   at least a portion of the metal member is the housing case.

7. The power reception apparatus according to claim 6, wherein
   the protruding portion includes a peripheral surface, and a bottom surface portion formed at a tip portion of the peripheral surface, and
   the peripheral surface of the protruding portion is a curved surface that projects toward a central region of the protruding portion, and a width of the protruding portion in a direction perpendicular to the winding axis of the power reception coil decreases as the protruding portion extends toward the electric power reception direction.

8. A power reception apparatus comprising:
   a power reception coil which includes a first main surface and a second main surface located opposite the first main surface in an electric power reception direction, and which has a hollow formed in a center of the power reception coil;
   a ferrite core disposed at the second main surface of the power reception coil and having an opening formed therein, the opening located in the hollow when the power reception coil is viewed in a direction in which a winding axis of the power reception coil extends; and
   a high-resistance member which is disposed in a space formed by the hollow and the opening, which is located in the opening when the power reception coil is viewed in the direction in which the winding axis of the power reception coil extends, and which has higher magnetic resistance than a magnetic resistance of the ferrite core.

* * * * *